United States Patent [19]
Sakai

[11] Patent Number: 6,104,559
[45] Date of Patent: Aug. 15, 2000

[54] HEAD POSITION DETECTING METHOD AND DISK DEVICE

[75] Inventor: Yoshimichi Sakai, Kawasaki, Japan

[73] Assignee: Fujitsu Limited, Kawasaki, Japan

[21] Appl. No.: 08/934,801

[22] Filed: Sep. 22, 1997

[30] Foreign Application Priority Data

Mar. 6, 1997 [JP] Japan ................................ 9-052086

[51] Int. Cl.⁷ .............................. G11B 5/09; G11B 21/02; G11B 5/596
[52] U.S. Cl. ........................... 360/51; 360/75; 360/78.14
[58] Field of Search .................... 360/51, 77.05, 360/77.08, 78.14, 75

[56] References Cited

U.S. PATENT DOCUMENTS 4,577,244 3/1986 El-Sadi .
5,694,265 12/1997 Kosugi et al. ........................... 360/51

FOREIGN PATENT DOCUMENTS

| 4438395 | 10/1995 | Germany . |
| 1-138666 | 5/1989 | Japan . |
| 2-189775 | 7/1990 | Japan . |
| 5-114257 | 5/1993 | Japan . |
| 7-334948 | 12/1995 | Japan . |

*Primary Examiner*—Paul Loomis
*Assistant Examiner*—Regina Y. Neal
*Attorney, Agent, or Firm*—Greer, Burns & Crain, Ltd.

[57] ABSTRACT

A noise component is eliminated from a servo signal recorded on a recording medium and read by a head. A number of times that a noise eliminated servo signal crosses zero-cross points is counted in order to determine an integration period based on the number of times. The noise-eliminated servo signal is integrated for the integration period, an integrated value thus obtained indicating a position of the head.

29 Claims, 17 Drawing Sheets

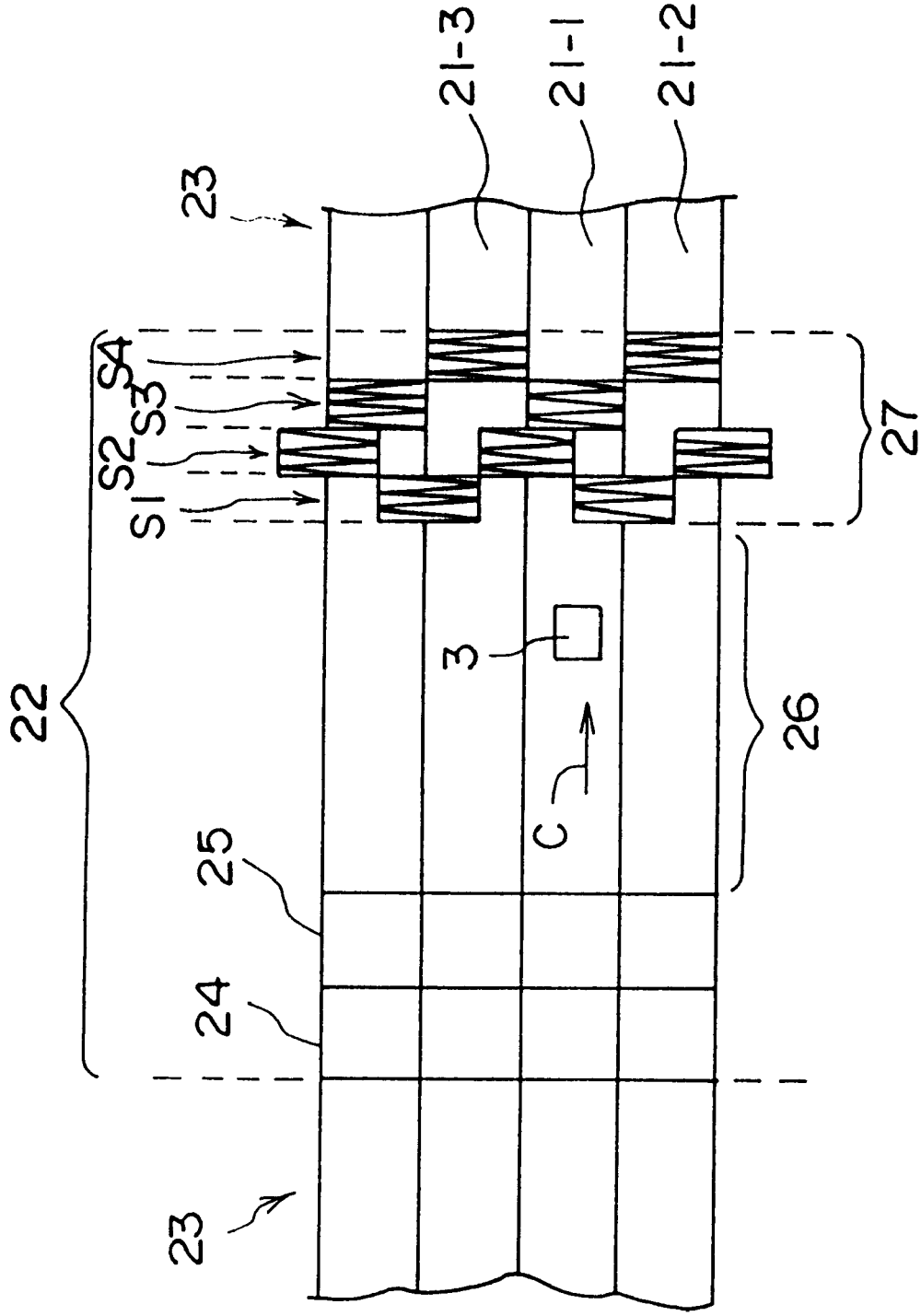

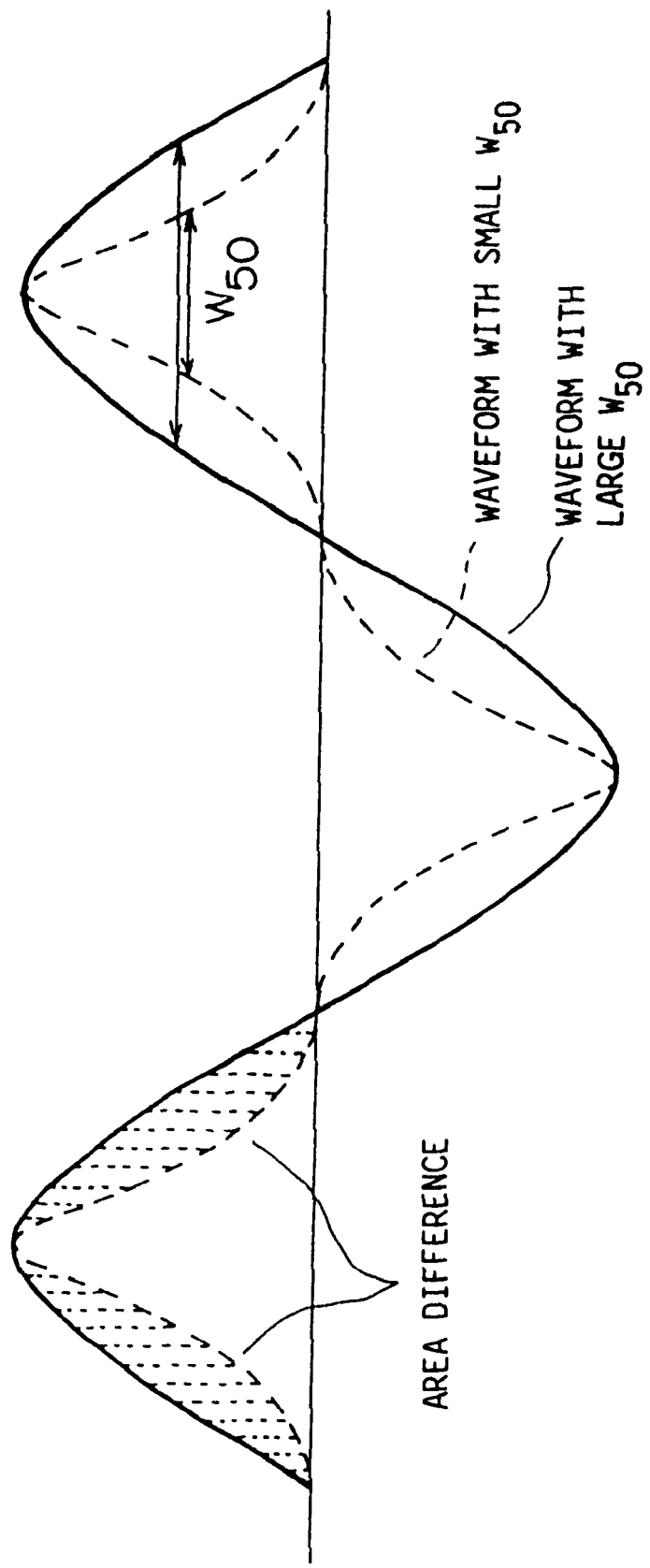

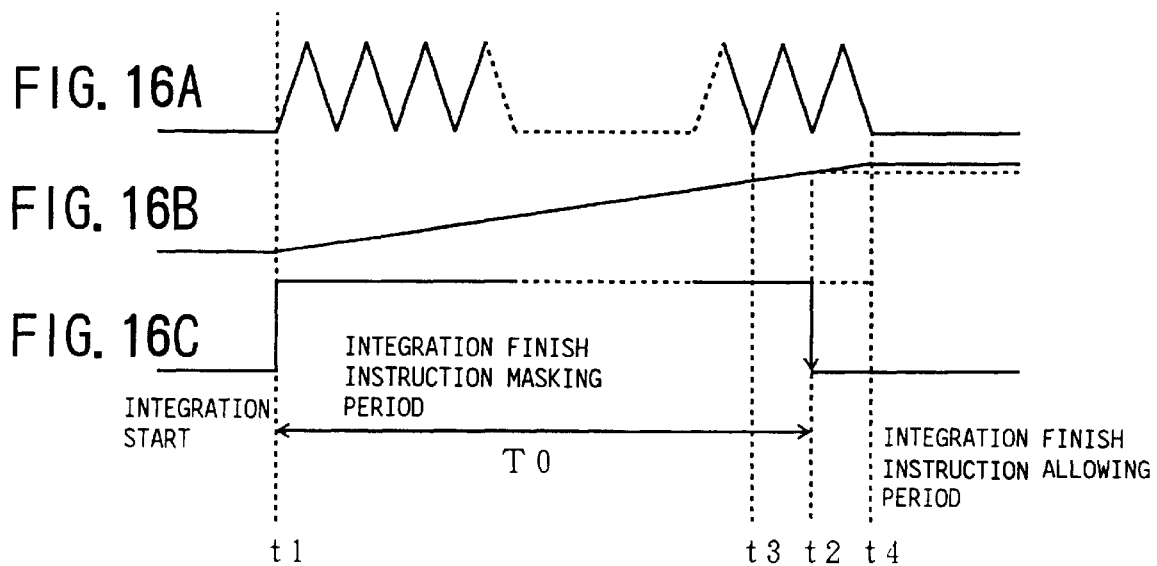

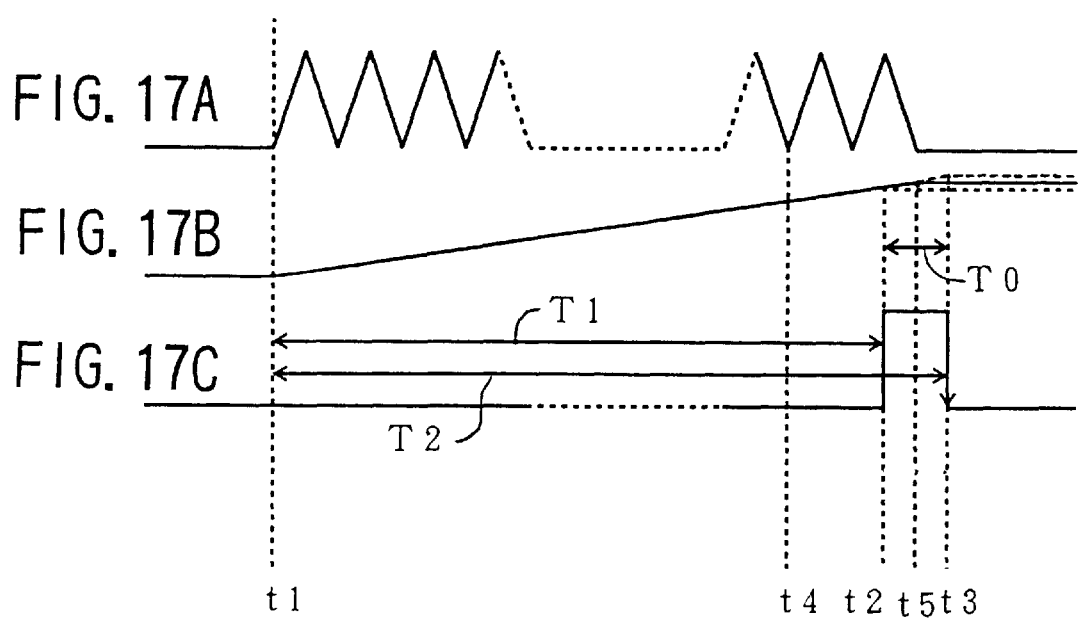

HEAD POSITION DETECTING METHOD AND DISK DEVICE

BACKGROUND OF THE INVENTION

1. Field of the Invention

The present invention relates to a head position detecting method and a disk device, and, in particular, to a head position detecting method and disk device in which a servo signal is detected in accordance with an area servo method.

Recently, as an information amount increases in an information-oriented society, increase of the storage capacity of a magnetic disk device and high-speed access to stored data are demanded. Therefore, for a magnetic disk, increase of BPI (Byte Per Inch: a unit for indicating a recording density) and improvement of TPI (Tracks Per Inch: a unit for indicating a track density) are requested.

However, in a magnetic disk device, when increasing TPI, a dead space between tracks decreases. When a dead space between tracks decreases, higher head position detecting accuracy is required.

In order to achieve higher head position detecting accuracy, it is necessary to detect a servo signal with high accuracy. For this purpose, a servo signal detecting method has been changed from a peak hold method to a so-called area servo method. In the peak hold method, the head position is detected from the peak value of a servo signal. In the area servo method, a servo signal waveform is integrated and the head position is detected from the integrated value.

2. Description of the Related Art

FIG. 1 shows a block diagram of one example of a magnetic disk device in the related art.

The magnetic disk device 1 causes magnetic heads 3 to approach magnetic disks 2, which are made of a magnetic substance and rotate in an arrow-A direction, and performs information recording and reproducing. In the magnetic disks, cylinders are previously set concentrically for fixing information recording and reproducing positions. The magnetic heads 3 are held at a projecting end of an arm 4. The other end of the arm 4 is held by an actuator 5. The actuator 5 rotates the arm 4 in an arrow-B direction about a shaft 5a, and performs position control so as to position the magnetic heads 3 at a desired cylinder.

Further, the signal reproduced as a result of the magnetic heads 3 scanning the magnetic disk 2 is supplied to a R/W (Read/Write) pre-amplifier 6. The R/W pre-amplifier 6 amplifies the signal reproduced by the magnetic heads 3, supplies the signal to an automatic gain control (AGC) amplifier 7, and, also, amplifies a recording signal to be recorded to the magnetic disks 2 and supplies the signal to the magnetic heads 3.

The AGC circuit 7 controls the amplitude of the main signal of the reproduced signal amplified by the R/W pre-amplifier 6 to be equal to or less than a fixed level. The output signal of the AGC circuit 7 is supplied to a signal detecting portion 8 and a servo detecting portion 9. The signal detecting portion 8 reads control information and data from the reproduced signal, converts it into digital information and supplies it to a CPU 10. The CPU 10 decodes the digital information read from the signal detecting portion and outputs it as reproduced data.

The servo detecting circuit 9 detects a servo portion of the output signal of the AGC amplifier 7, detects the current position of the magnetic heads 3 by a servo burst signal of the servo portion, generates an error signal and supplies it to the CPU 10.

In accordance with the error signal from the servo detecting portion 9, the CPU 10 generates a position control signal for controlling the position of the magnetic heads 3, and supplies the signal to a D/A (Digital/Analog) converter 11. The D/A converter 11 converts the position control signal supplied by the CPU 10 into an analog signal and supplies the signal to a driver 12. In accordance with the position control signal supplied by the D/A converter 11, the driver 12 generates a driving signal for driving the actuator 5, and supplies the signal to the actuator 5.

The actuator 5 rotates about the shaft 5a in accordance with the driving signal supplied by the driver 12, and rotates the arm 4 in the arrow-B direction. As a result of the rotation of the actuator 5, the magnetic heads 3 held at the projecting end of the arm 4 move in the arrow-B direction on the magnetic disks 2, and scan a desired cylinder on the magnetic disks 2.

FIGS. 2A and 2B show a data format of the magnetic disks. FIG. 2A shows a perspective view of the magnetic disk 2 and FIG. 2B shows a development of the cylinders.

As shown in FIG. 2A, the plurality of cylinders 21 are formed concentrically on the two sides of the magnetic disk 2. As shown in FIG. 2B, the servo portions 22 are formed with predetermined intervals in the cylinders 21 for recognizing the position of the magnetic heads 3 as a result of being read by the magnetic heads 3. Between the servo portions, data portions 23 for writing data thereto are formed.

At the time of recording and reproducing, the servo burst signal written in the servo portions 22 is reproduced by the magnetic heads 3, and, through the reproduced signal, the cylinder number at which the magnetic heads 3 currently scan and the position shift on the cylinder are recognized by the CPU 10.

FIG. 3 shows a data format of the servo portion of the magnetic disks.

The servo portion 22 includes an AGC portion 24 for fixing the signal reception level, a training pattern portion 25 for indicating the start of the servo information, a servo information portion 26 in which digital information such as the cylinder number and so forth are recorded and a servo burst portion 27 in which the servo burst signal for generating a tracking error signal is recorded.

As shown in FIG. 3, the servo burst portion 27 includes the servo burst signals S1, S2, which are formed to lie across adjacent cylinders, and the servo burst signals S3, S4, which are formed on respective cylinders. The servo burst signals S1, S2, S3 and S4 are formed successively in the direction in which the cylinders extend.

FIG. 4 shows a waveform of the servo burst signals reproduced by the magnetic heads. FIG. 4 shows the waveform of the reproduced signal obtained when, in FIG. 3, the magnetic head 3 scans an approximately central portion of the cylinder 21-1 in an arrow-C direction.

During the time from t0 through t1, the magnetic head 3 scans the servo burst signal S1. During this time, because the servo burst signal S1 is formed to lie across from the center of the cylinder 21-1 to the center of the cylinder 21-2, when the magnetic head 3 scans the center of the cylinder 21-1, the magnetic head 3 scans approximately half of the servo burst signal S1. Accordingly, the amplitude is approximately half in comparison to the case where the magnetic head 3 reproduces the servo burst signal with the entirety of the magnetic head 3.

Then, when, during the time from t1 through t2, the magnetic head 3 scans the cylinder 21-1 in the arrow-C direction, the magnetic head 3 scans the servo burst signal S2. During this time, because the servo burst signal S2 is formed to lie across from the center of the cylinder 21-3 to the center of the cylinder 21-1, when the magnetic head 3 scans the center of the cylinder 21-1, the magnetic head 3 scans approximately half of the servo burst signal S2. Accordingly, the amplitude is approximately half in comparison to the case where the magnetic head 3 reproduces the servo burst signal with the entirety of the magnetic head 3.

Then, when, during the time from t2 through t3, the magnetic head 3 scans the cylinder 21-1 in the arrow-C direction, the magnetic head 3 scans the servo burst signal S3. During this time, because the servo burst signal S3 is formed across the entire width of the cylinder 21-1, all of the signal reproduced by the magnetic head 3 is the servo burst signal, and the amplitude is maximum among the cases where the magnetic head 3 reproduces the servo burst signals.

Then, when, during the time from t3 through t4, the magnetic head 3 scans the cylinder 21-1 in the arrow-C direction, the magnetic head 3 scans between the servo burst signals S4. Accordingly, the servo burst signals S4 are not reproduced.

The reproduced signals of the servo burst signals as shown in FIG. 4 are supplied to the servo detecting portion 9 through the R/W pre-amplifier 6 and AGC amplifier 7. In order to accurately obtain the difference between the above-mentioned servo burst signal S1 and servo burst signal S2 which are formed across adjacent cylinders, the servo detecting portion 9 obtains the integrated values obtained from integrating the servo burst signal S1 and servo burst signal S2.

FIG. 5 shows a block diagram of one example of the servo detecting portion in the related art.

The servo detecting portion 9 includes a full-wave rectifier 31 which performs full-wave rectification on the output servo burst signal of the AGC amplifier 7, an integrating circuit 32 which integrates the servo burst signal which has undergone the full-wave rectification in the full-wave rectifier 31, an A/D converter 33 which converts the integrated value obtained from the integrating circuit 32 into the digital data, a zero-crossing detector 34 which detects the zero-crossing points of the output servo burst signal of the AGC amplifier 7 and an integration control circuit 35 which counts the zero-crossing points detected by the zero-crossing detector 34 and controls the integrating circuit 32 so that the integrating circuit 32 holds the integrated value when the count becomes a previously set count value.

FIG. 6 shows a block diagram of the integrating circuit in the related art.

The integrating circuit 32 includes a capacitor Cap which stores the servo burst signal which has undergone the full-wave rectification in the full-wave rectifier 31 and a holding circuit 36 which holds the charged voltage stored in the capacitor Cap.

The CPU 10 and the integration control circuit 35 are connected to the holding circuit 36, and the holding circuit 36 discharges the charged voltage held in the capacitor Cap and holds the charged voltage of the capacitor Cap. In response to a start control signal from the CPU 10, the holding circuit 36 discharges the capacitor Cap and charges the servo burst signal in the capacitor Cap.

The start control signal from the CPU 10 is also supplied to the integration control circuit 35 and resetting of the zero-crossing point count value is performed. The integration control circuit 35 is reset by the start control signal from the CPU 10, counting is started, and the integration control circuit 35 causes the holding circuit 36 to hold the charged voltage of the capacitor Cap when the count becomes the predetermined count value.

FIGS. 7A, 7B and 7C show an operation explanation drawing. FIG. 7A shows the servo burst signal, FIG. 7B shows the zero-crossing count value and FIG. 7C shows the charged voltage of the capacitor Cap.

When the start control signal is output from the CPU 10 at the time t0, the capacitor Cap is discharged, the charged voltage of the capacitor Cap becomes zero as shown in FIG. 7C, the integration control circuit 35 is reset as shown in FIG. 7B and the zero-crossing point-count value of the servo burst signal is caused to be zero.

Then, when the servo burst signal passes the zero-crossing point at the time t1 as shown in FIG. 7A, the count value of the integration control circuit 35 is incremented and becomes '1'. Similarly, at the times from t2 through t10, the servo burst signal crosses zero, and the count value of the integration control circuit 35 is incremented. During the time, the capacitor Cap is charged with the signal obtained from performing full-wave rectification on the servo burst signal shown in FIG. 7A, and the charged voltage thereof increases as shown in FIG. 7C.

When the count value of the integration control circuit 35 becomes the predetermined count value '10' at the time t10, the integration control circuit 35 controls the holding circuit 36 so that the charging of the capacitor Cap is stopped. Further, the integration control circuit 35 causes the holding circuit 36 to hold the charged voltage of this time. The charged voltage V1 held in the holding circuit 36 is converted into the digital data by the A/D converter 33 and is supplied to the CPU 10.

In accordance with the difference between the integrated values of the servo burst signal S1 and the servo burst signal S2, the CPU 10 generates an error signal for controlling the position of the magnetic head 3 so that the magnetic head 3 scans the center of the desired cylinder 21-1.

However, in the servo detecting circuit, using the area servo method, of the magnetic disk device in the related art, when noises occur around the zero-crossing point of the servo burst signal as indicated by broken lines around the times t11, t5 and t12 of FIG. 7A, the noises are counted as the zero-crossing points as indicated by (5) and (7) in FIG. 7B, the peak number of the burst signal to be integrated increases and the count value of the integration control circuit becomes '10' at the time t8. Accordingly, although the integration by the capacitor Cap should be stopped at the time t10, the integration is stopped at the time t8. As a result, the integrated value V2, of the integration period shorter by the time (t10−t8) than that of the integrated value V1 of the normal case, is detected.

Thus, due to the noises, variation occurs in the integrated value of the servo burst signal, the accurate on-track condition cannot be detected, the head cannot be positioned accurately, and so forth. Thus, a problem occurs.

Further, in the servo circuit, using the area servo method, of the magnetic disk device in the related art, the capacitance for charging the servo burst signal is fixed. The waveforms of the read servo burst signals are different between the case of the position of the magnetic head being on the inner side of the magnetic disk and the case of the position of the magnetic head being on the outer side of the magnetic disk.

FIG. 8 shows waveforms of the servo burst signals of the inner side and outer side of the magnetic disk.

In FIG. 8, the solid line indicates the waveform of the servo burst signal of the inner side and the broken line indicates the waveform of the servo burst signal of the outer side.

Because recording density of the magnetic disk is different between the inner side and outer side of the magnetic disk, a difference occurs in the half-value widths $W_{50}$ of the reproduced servo burst signals. When recording density is maximum in the inner side, the half-value width $W_{50}$ of the servo burst signal in the outer side decreases and the waveform is distorted as indicated by the broken line in the figure.

Accordingly, in the outer side of the magnetic disk, the integrated value of the servo burst signal is smaller than that of the inner side by the amount indicated by the broken-line hatching in FIG. 8. When the integrated value of the servo burst signal becomes smaller, change of the integrated value for the position of the magnetic head becomes smaller. Thereby, the difference of the integrated value of the burst signal for the change amount becomes smaller and sensitivity for position shift of the magnetic head is lowered. As a result, head positioning cannot be performed accurately and so forth. Thus, a problem occurs.

SUMMARY OF THE INVENTION

The present invention has been devised in consideration of the above-mentioned problems. An object of the present invention is to provide a head position detecting method and a disk device in which, by accurately detecting the servo burst signal, head positioning can be accurately performed.

A first head position detecting method according to the present invention is a method in which a servo signal previously written on a disk is read through a head, the servo signal read through the head is integrated for a predetermined number of zero-crossing points of the servo signal, and, based on information obtained from the integration, the position of the head on the disk is detected, wherein the servo signal is detected, a noise component which varies the servo signal across the zero-crossing point of the servo signal is removed, and a period of the integration is determined as a result of counting the zero-crossing points of the servo signal from which the noise component has been removed.

In this method, the servo signal is detected, a noise component which varies the servo signal across the zero-crossing point of the servo signal is removed, and the zero-crossing points are detected by counting the zero-crossing points of the servo signal from which the noise component has been removed. Thereby, noises are prevented from being counted as the zero-crossing points. Accordingly, the servo signal integration period can be precisely detected, and thereby, the position of the head on the disk can be precisely detected.

A second head position detecting method according to the present invention is a method in which a servo signal previously written on a disk is read through a head, the servo signal read through the head is integrated for a predetermined number of zero-crossing points of the servo signal, and, based on information obtained from the integration, the position of the head on the disk is detected, wherein:
the zero-crossing points of the servo signal are detected, the zero-crossing points are counted, and the time since the detection of the zero-crossing points of the servo signal was started is measured; and
when the measured time has reached or exceeded a predetermined time which is shorter than a time from a time at which count of the zero-crossing points of the servo signal was started to a time at which the count reaches a predetermined count value, and also, when the number of the detected zero-crossing points has reached the predetermined count value, the servo signal integration operation is stopped.

In this method, even if noises in the servo signal are counted as the zero-crossing points and the count value has reached the predetermined count value within the predetermined time, stopping of the integration is not allowed until the predetermined time elapses. Accordingly, the integrated value which is less than is necessary is prevented from being detected. Thereby, influence of noises or the like can be reduced and the position of the head on the disk can be precisely detected.

A third head position detecting method according to the present invention is a method in which a servo signal previously written on a disk is read through a head, the servo signal read through the head is integrated for a predetermined number of zero-crossing points of the servo signal, and, based on information obtained from the integration, the position of the head on the disk is detected, wherein:
the zero-crossing points of the servo signal are detected, the zero-crossing points are counted, and the time since the detection of the zero-crossing points of the servo signal was started is measured; and
when the measured time has reached a predetermined time which is longer than a time from a time at which count of the zero-crossing points of the servo signal was started to a time at which the count reaches a predetermined count value, the servo signal integration operation is stopped.

In this method, even if the zero-crossing points are not counted due to erroneous counting and the integration is not stopped although it is the time the integration should be stopped, the integration is stopped when the predetermined time, which is longer than the time at which the count value reaches the predetermined value, elapses. Accordingly, the integrated value which is more than is necessary is prevented from being detected. Thereby, influence of erroneous counting or the like can be reduced and the position of the head on the disk can be precisely detected.

A fourth head position detecting method is a method in which a servo signal previously written on a disk is read through a head, and, based on information obtained from integrating the servo signal read through the head, the position of the head on the disk is detected, wherein, in accordance with a position at which the head detects the servo signal on the disk, integration sensitivity is controlled so that the inclination of the servo signal integrated value is fixed.

In this method, the integration sensitivity is controlled in accordance with a position of the head on the disk so that the inclination of the integrated value of the servo signal is fixed. Thereby, in a case of a hard disk drive where the half-value widths $W_{50}$ of the servo signals detected through the head vary between an inner portion and an outer portion of the disk, the integrated values thereof can be approximately fixed. Accordingly, control sensitivity can be fixed between the inner portion and the outer portion of the disk.

A fifth head position detecting method is a method in which a noise component which varies the servo signal across the zero-crossing point of the detected servo signal is removed, and the position of the head is detected as a result of integrating the servo signal from which the noise component was removed. This method also includes the features of the above-described second and third head position detecting methods.

In this method, the servo signal is detected, a noise component which varies the servo signal across the zero-crossing point of the servo signal is removed, and the zero-crossing points are detected by counting the zero-crossing points of the servo signal from which the noise component has been removed. Thereby, noises are prevented from being counted as the zero-crossing points. Accordingly, the servo signal integration period can be precisely detected, and thereby, the position of the head on the disk can be precisely detected. Further, even if noises cannot be sufficiently removed and the count value has reached the predetermined count value within the predetermined time, stopping of the integration is not allowed until the predetermined time elapses. Accordingly, the integrated value which is less than is necessary is prevented from being detected. Thereby, influence of noises or the like can be reduced and the position of the head on the disk can be precisely detected. Further, even if the zero-crossing points are not counted due to erroneous counting and the integration is not stopped although it is the time the integration should be stopped, the integration is stopped when the predetermined time, which is longer than the time at which the count value reaches the predetermined value, elapses. Accordingly, the integrated value which is more than is necessary is prevented from being detected. Thereby, influence of erroneous counting or the like can be reduced and the position of the head on the disk can be precisely detected.

A sixth head position detecting method is a method in which, when the servo signal read through the head is integrated, in accordance with a position at which the head detects the servo signal on the disk, integration sensitivity is controlled so that the inclination of the servo signal integrated value is fixed.

In this method, the integration sensitivity is controlled in accordance with a position of the head on the disk so that the inclination of the integrated value of the servo signal is fixed. Thereby, in a case of a hard disk drive where the half-value widths $W_{50}$ of the servo signals detected through the head vary between an inner portion and an outer portion of the disk, the integrated values thereof can be approximately fixed. Accordingly, control sensitivity can be fixed between the inner portion and the outer portion of the disk.

A first disk device is a device comprising: signal detecting means for detecting a signal previously written on a disk; a zero-crossing counter for counting zero-crossing points of a servo signal, of the signal detected by the signal detecting means, by which the position of the head is detected; an integrating circuit for integrating the servo signal until the count value of the zero-crossing counter reaches a predetermined count value; and control means for controlling the position of the head on the disk based on the integrated value integrated by the integrating circuit, wherein the disk device further comprises a filter, provided between the signal detecting means and the zero-crossing counter, for removing a noise component, which varies across the zero-crossing point, from the servo signal supplied by the signal detecting means, and supplying the resulting signal to the zero-crossing counter.

In this device, a noise component which varies the servo signal across the zero-crossing point of the servo signal is removed by the filter, and the zero-crossing points are detected by counting the zero-crossing points of the servo signal from which the noise component has been removed. Thereby, noises are prevented from being counted as the zero-crossing points. Accordingly, the servo signal integration period can be precisely detected, and thereby, the position of the head on the disk can be precisely detected.

A second disk device is a device comprising: signal detecting means for detecting a signal previously written on a disk; a zero-crossing counter for counting zero-crossing points of a servo signal, of the signal detected by the signal detecting means, by which the position of the head is detected; an integrating circuit for integrating the servo signal until the count value of the zero-crossing counter reaches a predetermined count value; and control means for controlling the position of the head on the disk based on the integrated value integrated by the integrating circuit, wherein the disk device further comprises:

time measuring means for measuring a time since counting of the zero-crossing counter was started; and integration stopping control means for stopping the servo signal integration operation when the measured time of the time measuring means has reached or exceeded a predetermined time which is shorter than a time from a time at which count of the zero-crossing points of the servo signal was started to a time at which the count reaches a predetermined count value, and also, when the number of the detected zero-crossing points has reached the predetermined count value.

In this device, the integration stopping control means stops the integration operation of the integrating circuit when the measured time of the time measuring means becomes the predetermined time which is close to the time at which the count value of the zero-crossing points of the servo signal becomes the predetermined count value, and also, when the count value of the zero-crossing counter becomes the predetermined count value. Thereby, even if noises of the servo signal are counted as the zero-crossing points and the count value has reached the predetermined count value within the predetermined time, stopping of the integration is not allowed until the predetermined time elapses. Accordingly, the integrated value which is less than is necessary is prevented from being detected. Thereby, influence of noises or the like can be reduced and the position of the head on the disk can be precisely detected.

A third disk device is a device comprising: signal detecting means for detecting a signal previously written on a disk; a zero-crossing counter for counting zero-crossing points of a servo signal, of the signal detected by the signal detecting means, by which the position of the head is detected; an integrating circuit for integrating the servo signal until the count value of the zero-crossing counter reaches a predetermined count value; and control means for controlling the position of the head on the disk based on the integrated value integrated by the integrating circuit, wherein the disk device further comprises:

time measuring means for measuring a time since counting of the zero-crossing counter was started; and integration stopping control means for stopping the servo signal integration operation when the measured time has reached a predetermined time which is longer than a time from a time at which count of the zero-crossing points of the servo signal was started to a time at which the count reaches a predetermined count value.

In this device, the integration stopping control means stops the servo signal integration operation when the measured time has reached the predetermined time which is longer than the time from the time at which count of the zero-crossing points of the servo signal was started to the time at which the count reaches the predetermined count value. Thereby, even if the zero-crossing points are not counted due to erroneous counting and the integration is not stopped although it is the time the integration should be stopped, the integration is stopped when the predetermined time, which is longer than the time at which the count value reaches the predetermined value, elapses. Accordingly, the integrated value which is more than is necessary is prevented from being detected. Thereby, influence of erroneous counting or the like can be reduced and the position of the head on the disk can be precisely detected.

A fourth disk device is a device obtained from modifying the above-described second or third disk device, further comprising a filter, provided between the signal detecting means and the zero-crossing counter, for removing a noise component, which varies across the zero-crossing point, from the servo signal supplied by the signal detecting means, and supplying the resulting signal to the zero-crossing counter.

In this device, a noise component which varies across the zero-crossing point of the servo signal is removed by the filter. Thereby, noises are prevented from being counted as the zero-crossing points. Accordingly, the servo signal integration period can be precisely detected, and thereby, the position of the head on the disk can be precisely detected.

A fifth disk device is a device comprising: signal detecting means for detecting a signal previously written on a disk; a zero-crossing counter for counting zero-crossing points of a servo signal, of the signal detected by the signal detecting means, by which the position of the head is detected; an integrating circuit for integrating the servo signal until the count value of the zero-crossing counter reaches a predetermined count value; and control means for controlling the position of the head on the disk based on the integrated value integrated by the integrating circuit, wherein the disk device further comprises integration sensitivity control means for controlling integration sensitivity so that the inclination of the servo signal integrated value is fixed, in accordance with a position at which the head detects the servo signal on the disk.

In this device, the integration sensitivity is controlled in accordance with a position of the head on the disk so that the inclination of the integrated value of the servo signal is fixed. Thereby, in a case of a hard disk drive where the half-value widths $W_{50}$ of the servo signals detected through the head vary between an inner portion and an outer portion of the disk, the integrated values thereof can be approximately fixed. Accordingly, control sensitivity can be fixed between the inner portion and the outer portion of the disk.

A sixth disk device is the device including the features of the above-described first, second, third and fourth disk devices, in which the disk device further comprises integration sensitivity control means for controlling integration sensitivity so that the inclination of the servo signal integrated value is fixed, in accordance with a position at which the head detects the servo signal on the disk.

In this device, in addition to reducing influence of noises and erroneous counting, head positioning precision can be uniform between an inner portion and an outer portion of the disk.

A seventh disk device is a device obtained from modifying the above-described fifth or sixth disk device, in which:

the integrating circuit comprises charge storing means which is charged with the servo signal; and the integration sensitivity control means controls capacitance of the charge storing means in accordance with a position at which the head detects the servo signal on the disk.

In this device, the inclination of the integrated value of the servo signal is fixed as a result of controlling the capacitance of the charge storing means in accordance with a position of the head on the disk. Thereby, head positioning precision can be uniform between an inner portion and an outer portion of the disk.

An eighth disk device is a device obtained from modifying the above-described seventh disk device, in which:

the charge storing means comprises a plurality of capacitors having different capacitances; and the integration sensitivity control means performs switching of connection of the plurality of capacitors, in accordance with a position at which the head detects the servo signal on the disk, so as to control the capacitance of the charge storing means.

In this device, the charge storing means includes the plurality of capacitors having different capacitances, and a desired capacitance can be selected by switching connection of the plurality of capacitors in accordance with the servo signal detected position. Thereby, the inclination of the integrated value of the servo signal can be fixed. Thereby, head positioning precision can be uniform between an inner portion and an outer portion of the disk.

A ninth disk device is a device obtained from modifying the above-described fourth, fifth, sixth or seventh disk device, in which:

the integrating circuit comprises a capacitor which is charged with a charging current; and the integration sensitivity control means controls the charging current of the capacitor in accordance with a position at which the head detects the servo signal on the disk.

In this device, the inclination of the integrated value of the servo signal can be fixed by controlling the charging current of the capacitor in accordance with a position at which the head detects the servo signal on the disk. Accordingly, head positioning precision can be uniform between an inner portion and an outer portion of the disk.

A tenth disk device is a disk device obtained from modifying the above-described ninth disk device, in which the integration sensitivity control means generates the charging current in accordance with the servo signal and supplies the charging current to the capacitor, and comprises a charging pump circuit for controlling the charging current in accordance with a position at which the head detects the servo signal on the disk.

In this device, the inclination of the integrated value of the servo signal can be fixed as a result of controlling the gain of the charging current with respect to the servo signal in the charging pump circuit. Accordingly, head positioning precision can be uniform between an inner portion and an outer portion of the disk.

Other objects and further features of the present invention will become more apparent from the following detailed description when read in conjunction with the accompanying drawings.

BRIEF DESCRIPTION OF THE DRAWINGS

FIG. 3 shows a data format of a servo portion of the magnetic disk;

FIG. 8 shows waveforms of the servo burst signals of an inner side and an outer side of the magnetic disk;

FIGS. 16A, 16B and 16C show an operation explanation drawing of a timer circuit in the embodiment of the present invention; and FIGS. 17A, 17B and 17C show an operation explanation drawing of a variant example of the timer circuit in the embodiment of the present invention.

DETAILED DESCRIPTION OF THE PREFERRED EMBODIMENT

Figure 1:
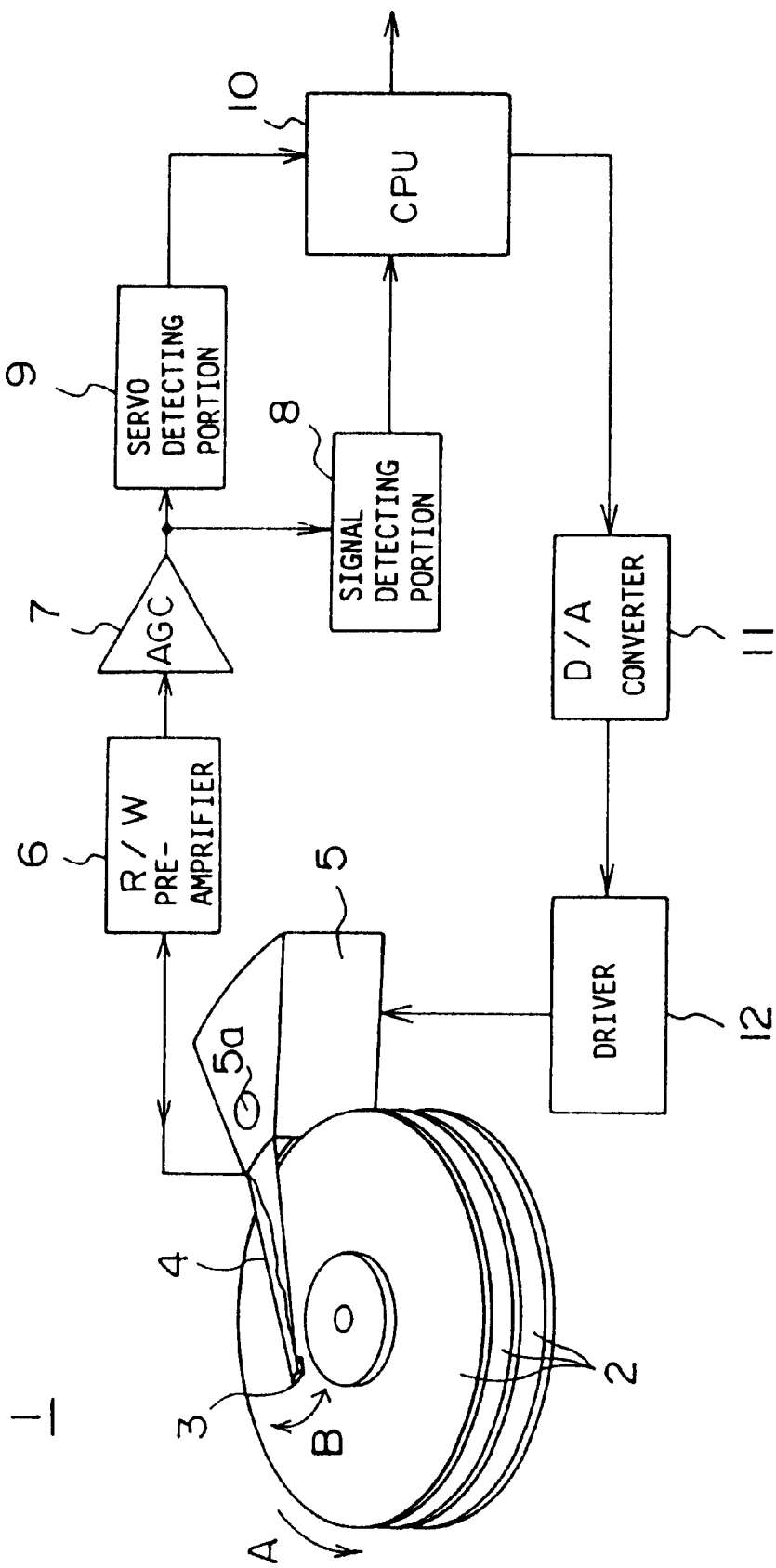
FIG. 1 shows a block diagram of one example of a magnetic disk device in the related art.
Figure 2A:
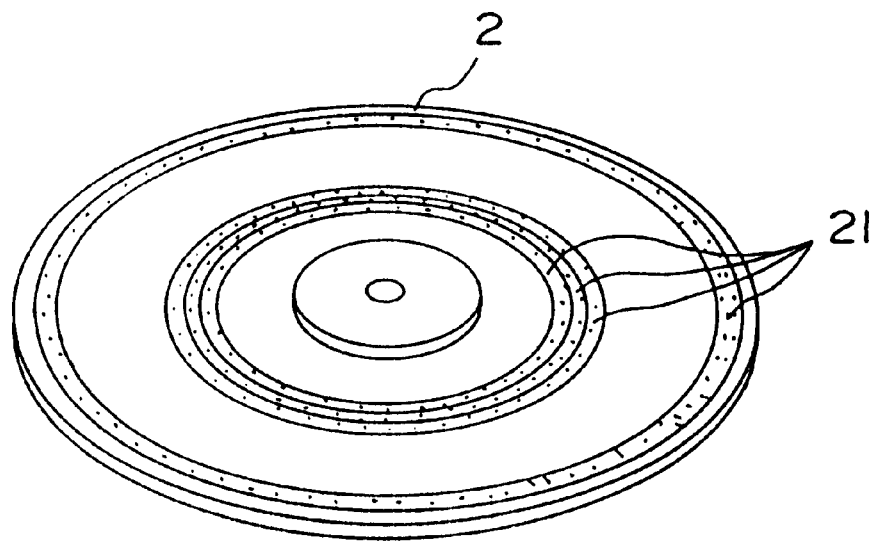
FIGS. 2A and 2B show a data format of a magnetic disk.
Figure 2B:
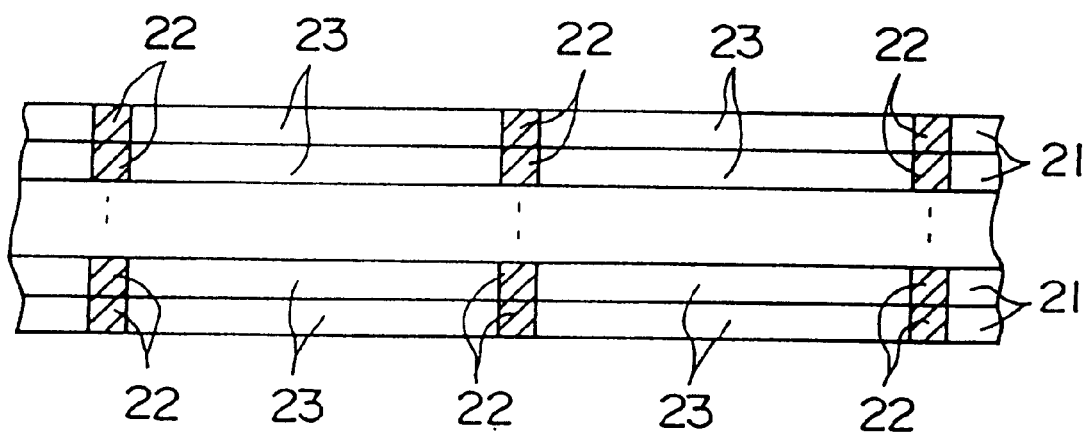
Figure 4:
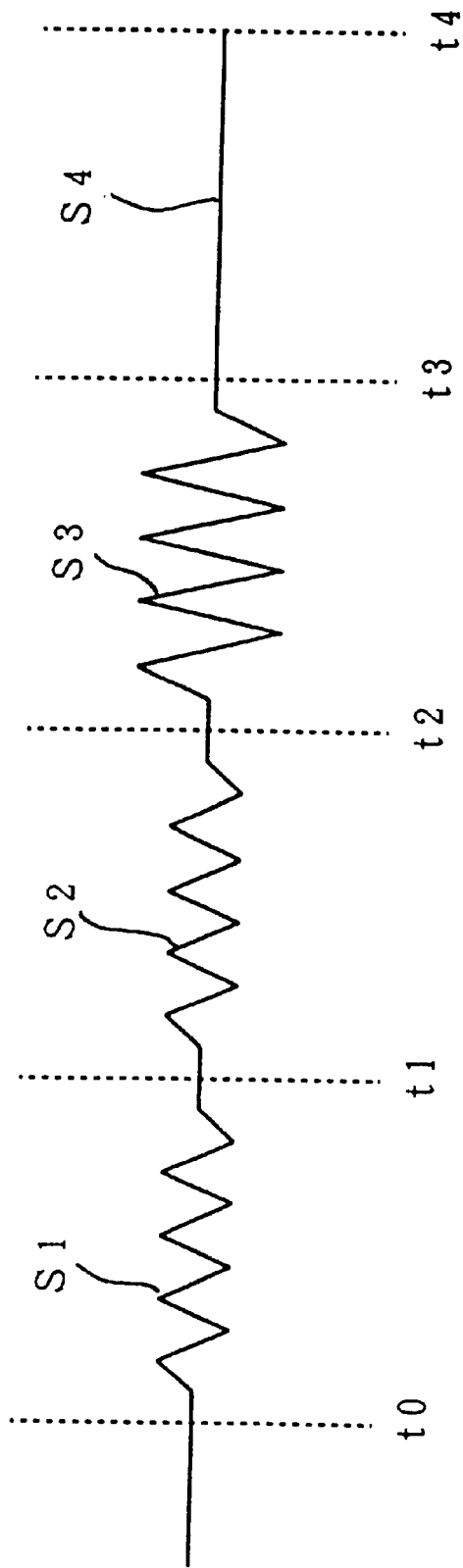
FIG. 4 shows a waveform of a reproduced signal when servo burst signals are reproduced through a magnetic head.
Figure 9:
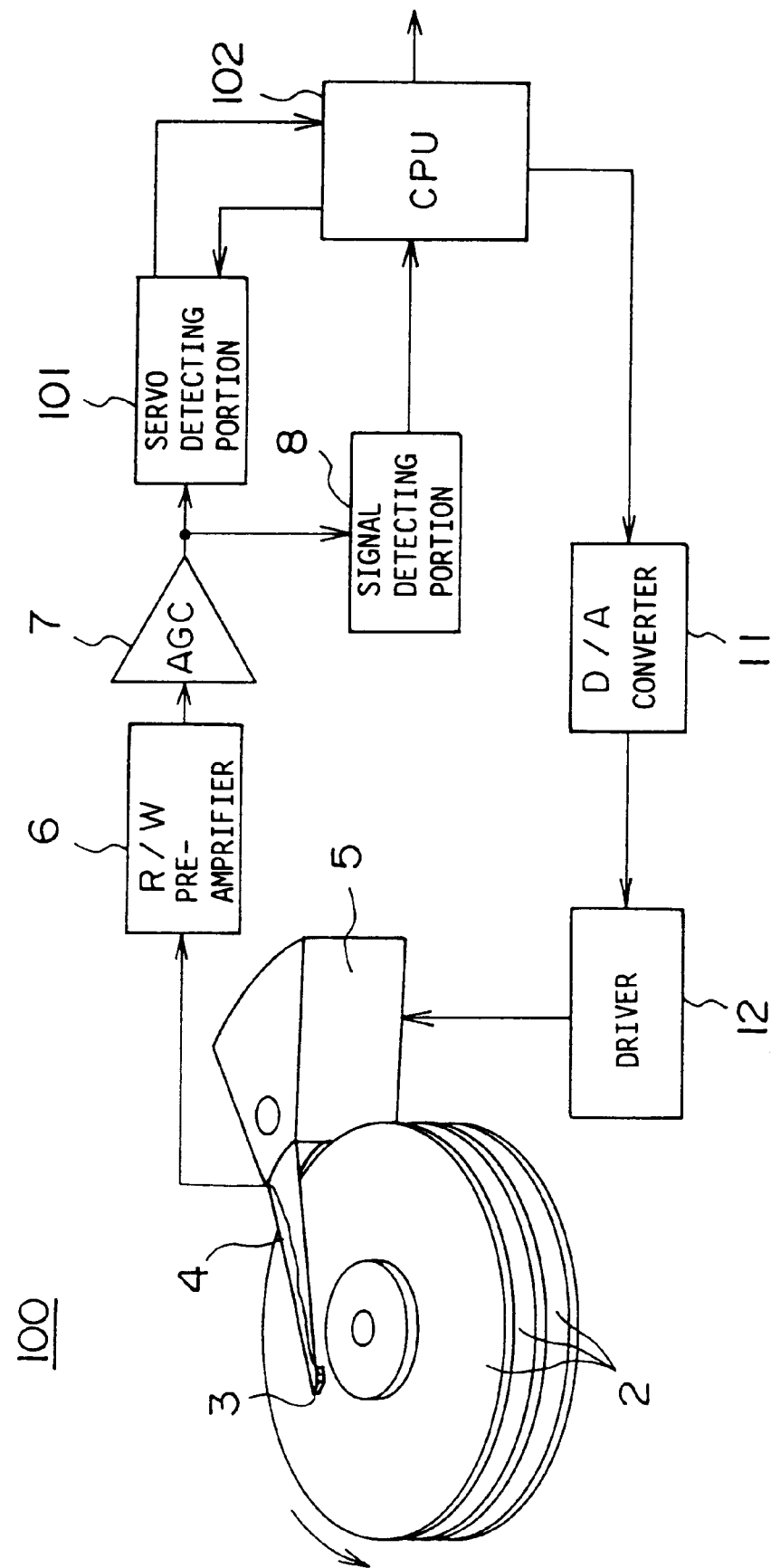
FIG. 9 shows a block diagram of one embodiment of the present invention.

FIG. 9 shows a block diagram of one embodiment of the present invention. In the figure, the same reference numerals are given to the parts the same as those of FIG. 1, and descriptions thereof will be omitted.

The embodiment is obtained as a result of applying a servo signal detecting method according to the present invention to a hard disk drive (HDD).

A servo detecting portion 101 of a hard disk drive 100 in the embodiment is a circuit which detects the integrated values of the servo burst signals and generates a tracking error signal from the difference of the servo burst signals. The servo detecting portion 101 removes high-frequency noises, which affect the detection of zero-crossing points, from the servo burst signals, and limits the period of the servo burst signal so as to prevent erroneous detection of the servo burst signal.

Figure 5:
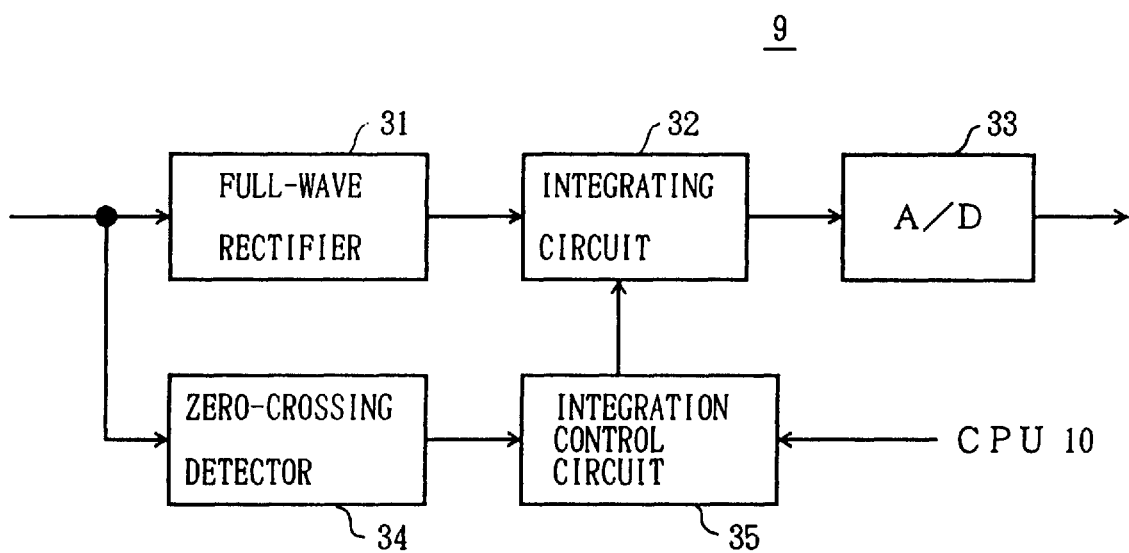
FIG. 5 shows a block diagram of one example of a servo detecting portion in the related art.
Figure 6:
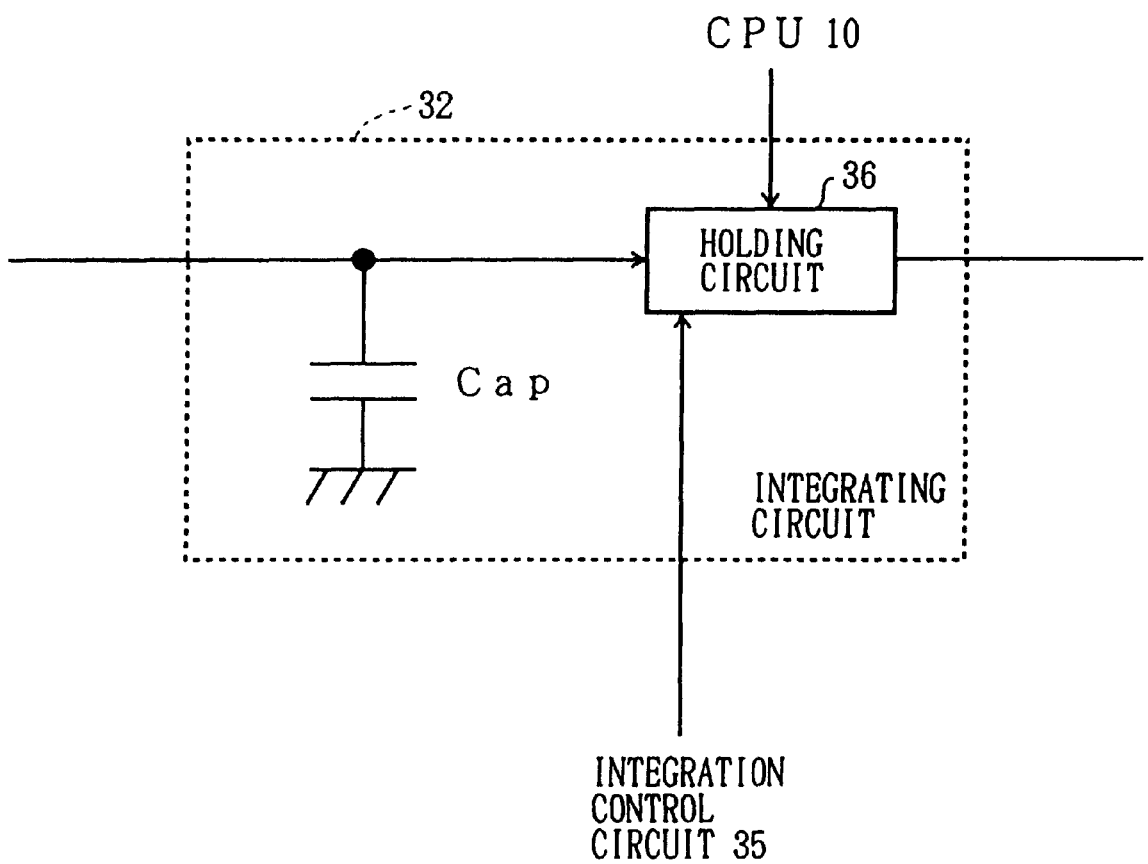
FIG. 6 shows a block diagram of one example of an integrating circuit in the related art.
Figures 7A, 7B, 7C:
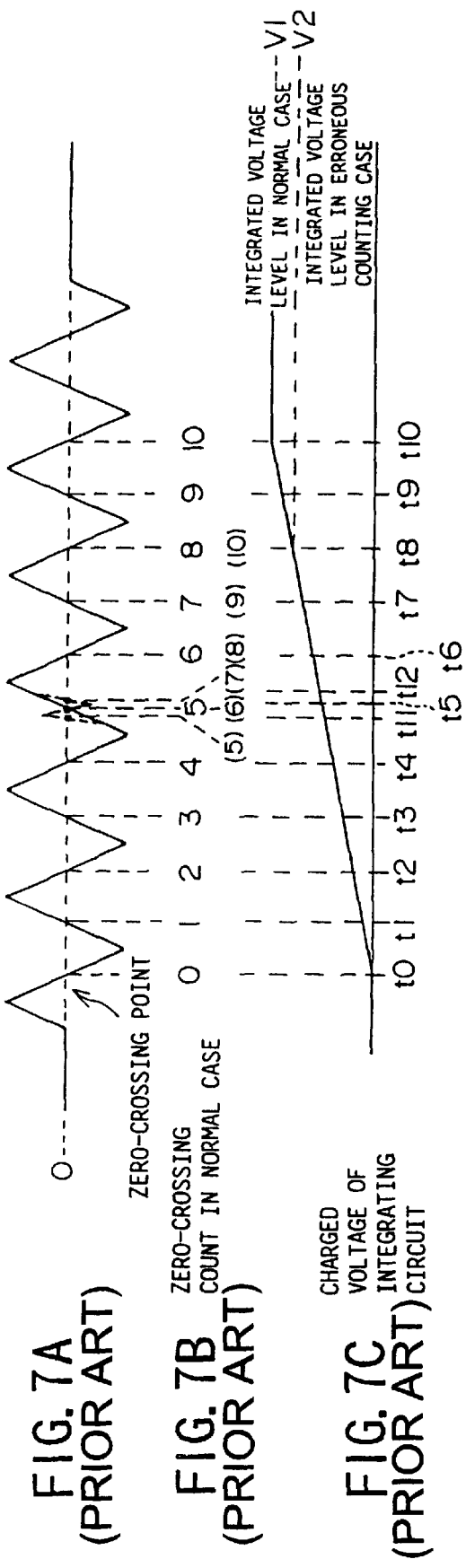
FIGS. 7A, 7B and 7C show an operation explanation drawing of the servo detecting portion in the related art.
Figure 10:
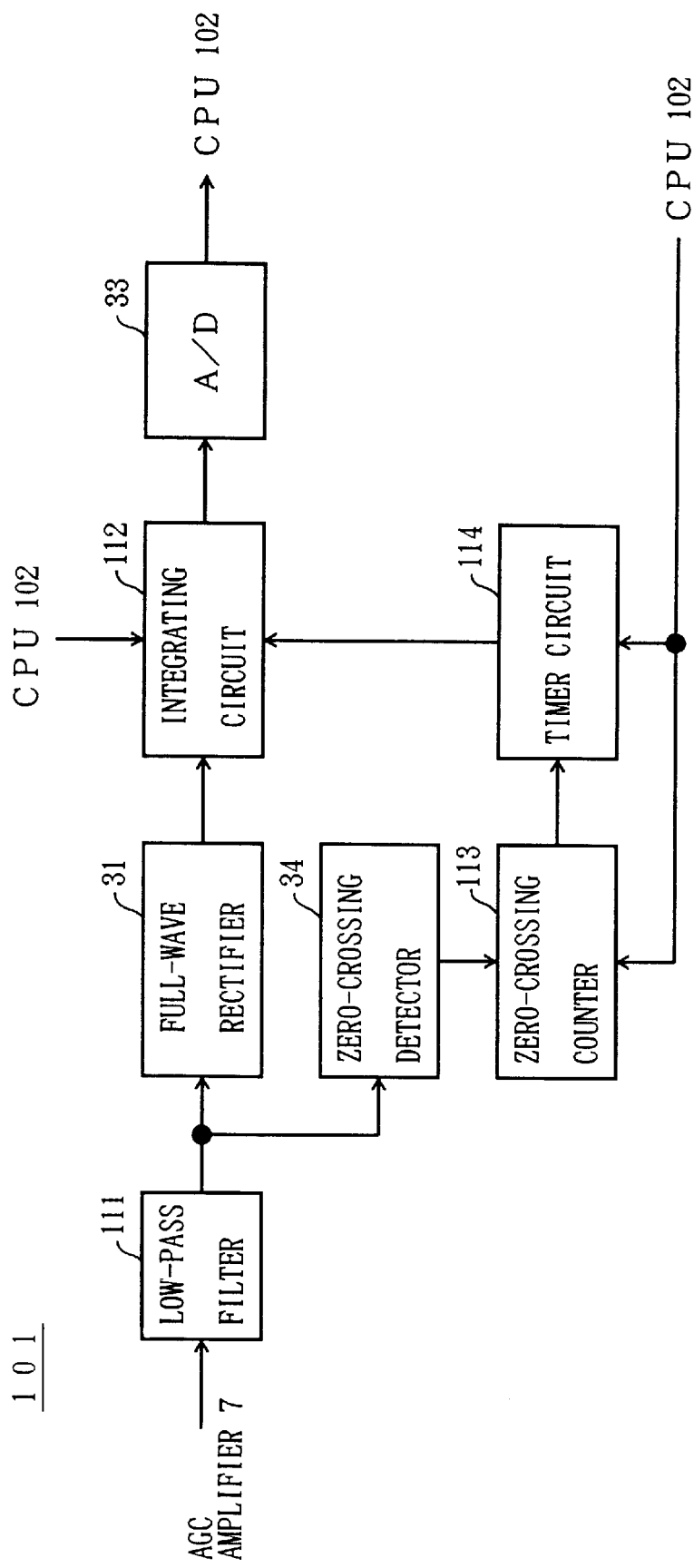
FIG. 10 shows a block diagram of a servo detecting portion in the embodiment of the present invention.

FIG. 10 shows a block diagram of the servo detecting portion 101 in the embodiment of the present invention. In the figure, the same reference numerals are given to the parts the same as those of FIG. 5, and descriptions thereof will be omitted.

The output signal of the AGC amplifier is supplied to the servo detecting portion 101 of the embodiment. In the servo detecting portion 101, the output signal of the AGC amplifier 7 is supplied to a low-pass filter 111 for removing the noises.

Assuming that the frequency of the servo burst signal is approximately from 7 through 8 MHz, the characteristic of the low-pass filter 111 is set so as not to pass the signals of frequencies equal to or higher than 20 MHz which is on the order of double the frequency of the servo burst signal. By this low-pass filter 111, the waveform of the servo burst signal is not distorted, the noise components are removed, and the servo burst signal is supplied to the zero-crossing detector 34. Accordingly, it is prevented that the zero-crossing detector 34 erroneously detects the noise components as zero-crossing points.

The signal from which the noise components have been removed by the low-pass filter 111 is supplied to the full-wave rectifier 31 and the zero-crossing detector 34. The full-wave rectifier 31 performs full-wave rectification on the signal supplied by the low-pass filter 111. The zero-crossing detector 34 detects zero-crossing points of the signal supplied by the low-pass filter 111. The signal which has undergone the full-wave rectification is supplied to an integrating circuit 112. The integrating circuit 112 causes the signal having undergone the full-wave rectification to change a capacitor, and thereby detects the integrated value of the servo burst signal. The integrated value is converted into digital data by the A/D converter 33, and then the digital data is supplied to a CPU 102.

The details of the integrating circuit 112 will now be described with reference to a figure.

Figure 11:
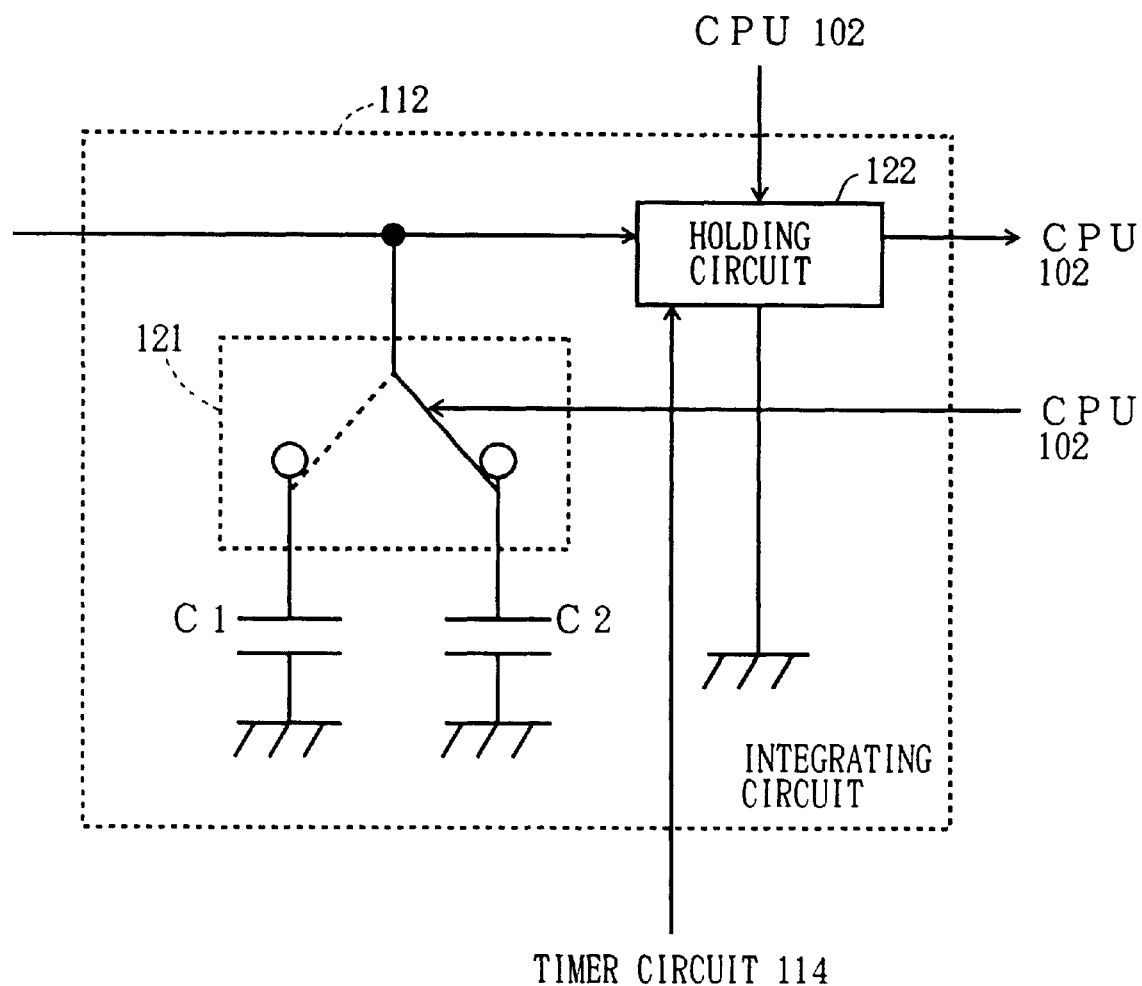
FIG. 11 shows a block diagram of an integrating circuit in the embodiment of the present invention.

FIG. 11 shows a block diagram of the integrating circuit in the embodiment of the present invention.

The integrating circuit 112 in the embodiment includes two capacitors C1 and C2 having different capacitances, a switching circuit 121 which selects the capacitor to be charged between the capacitors C1 and C2, and a holding circuit 122 which holds the charged voltage of the capacitor selected by the switching circuit 121.

The capacitance of the capacitor C1 is set to be larger than that of the capacitor C2, the capacitor C1 being selected when the position of the magnetic head 3 is on an inner side of a predetermined position of the magnetic disk 2. The capacitance of the capacitor C2 is set to be smaller than that of the capacitor C1, the capacitor C2 being selected when the position of the magnetic head 3 is on an outer side of the predetermined position of the magnetic disk 2.

A switching control signal is supplied to the switching circuit 121 from the CPU 102. In accordance with the switching control signal supplied from the CPU 102, the connection of the switching circuit 121 is changed between the capacitors C1 and C2.

The CPU 102 generates the switching control signal by capacitance switching processing performed in accordance with a cylinder number detection result.

Figure 12:
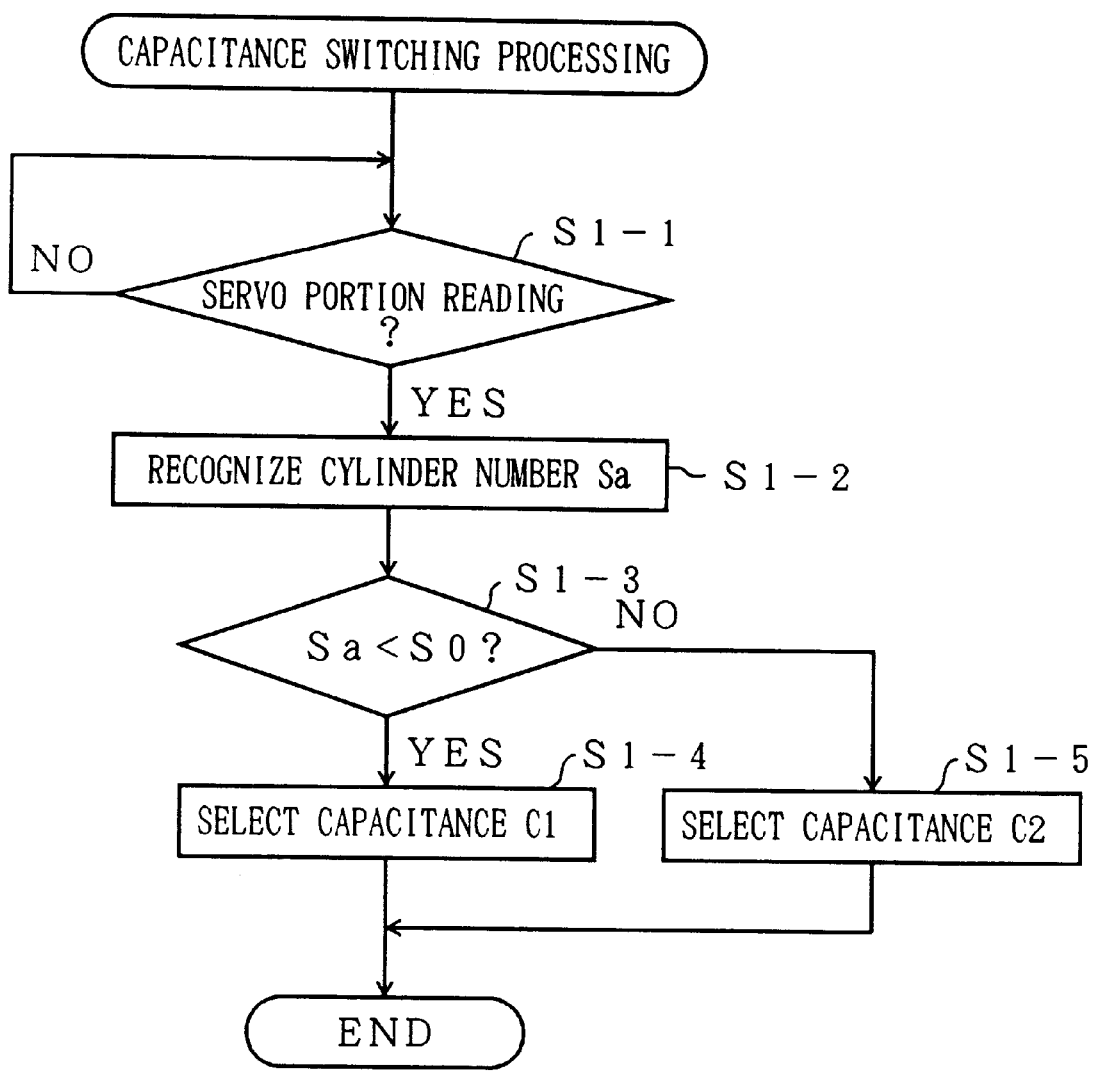
FIG. 12 shows a flowchart of capacitor switching processing of a CPU in the embodiment of the present invention.

FIG. 12 shows a flowchart of the capacitance switching processing of the CPU of the embodiment of the present invention.

The CPU 102 monitors the signal from the signal detecting portion 8, and, when detecting a servo portion reading shown in the figure, performs the capacitance switching processing. The CPU 102 recognizes cylinder number information Sa supplied by the signal detecting portion 8 (in steps S1-1, S1-2).

When recognizing the cylinder number information Sa in the step S1-2, the CPU 102 compares the recognized cylinder number information Sa with a previously set boundary cylinder number S0 which divides the outer side and the inner side of the magnetic disk 2 (in a step S1-3).

When the recognized cylinder number Sa is smaller than the boundary cylinder number S0 in the step S1-3, the CPU 102 determines that the magnetic head 2 is located on the inner side of the magnetic disk 2, and generates the switching control signal which controls the switching circuit 121 so that the capacitor C1 is connected (in a step S1-4).

When the recognized cylinder number Sa is larger than the boundary cylinder number S0 in the step S1-3, the CPU 102 determines that the magnetic head 2 is located on the outer side of the magnetic disk 2, and generates the switching control signal which controls the switching circuit 121 so that the capacitor C2 is connected (in a step S1-5).

Thus, by the capacitance switching processing by the CPU 102, it is determined whether the magnetic head 3 is currently present on the inner side or the outer side of the magnetic disk 2, in accordance with the cylinder number information stored in the servo portion of the magnetic disk 2 which the magnetic head 3 currently scans. Then, the switching control signal in accordance with the position of the magnetic head 3 is supplied to the switching circuit 121. In accordance with the switching control signal from the CPU 102, the switching circuit selects either the large-capacitance capacitor C1 or the small-capacitance capacitor C2.

Thus, when the magnetic head 3 is located on the inner side of the magnetic disk 2, the large-capacitance capacitor C1 is connected, and when the magnetic head 3 is located on the outer side of the magnetic disk 2, the small-capacitance capacitor C2 is connected.

Thereby, for the inner side of the magnetic disk in which the half-value width of the reproduced signal by the magnetic head 3 is large as shown in FIG. 8, the servo burst signal charges the capacitor C1 which has the capacitance larger than that for the outer side, and the integrated value is obtained. For the outer side of the magnetic disk 2 in which the half-value width of the reproduced signal by the magnetic head 3 is small as shown in FIG. 8, the servo burst signal charges the capacitor C2 which has the capacitance smaller than that for the inner side, and the integrated value is obtained. Accordingly, by performing setting so that no difference occurs between the integrated values for the inner side and outer side of the magnetic disk 2, it is possible that the position control sensitivities for the inner side and outer side of the magnetic disk 2 are approximately equal. Thereby, through the entire surface of the magnetic disk 2, the magnetic head 3 position control sensitivity can be fixed.

In the above-described integrating circuit 112, the inclination of the integrated value is fixed independent of the inner side and outer side of the magnetic disk by the switching of the capacitors C1 and C2 of the different capacitances. However, it can also be considered that the integrated value is fixed by changing charging current in accordance with the position of the magnetic head 3 on the magnetic disk 2 with a capacitor of a fixed capacitance.

Figure 13:
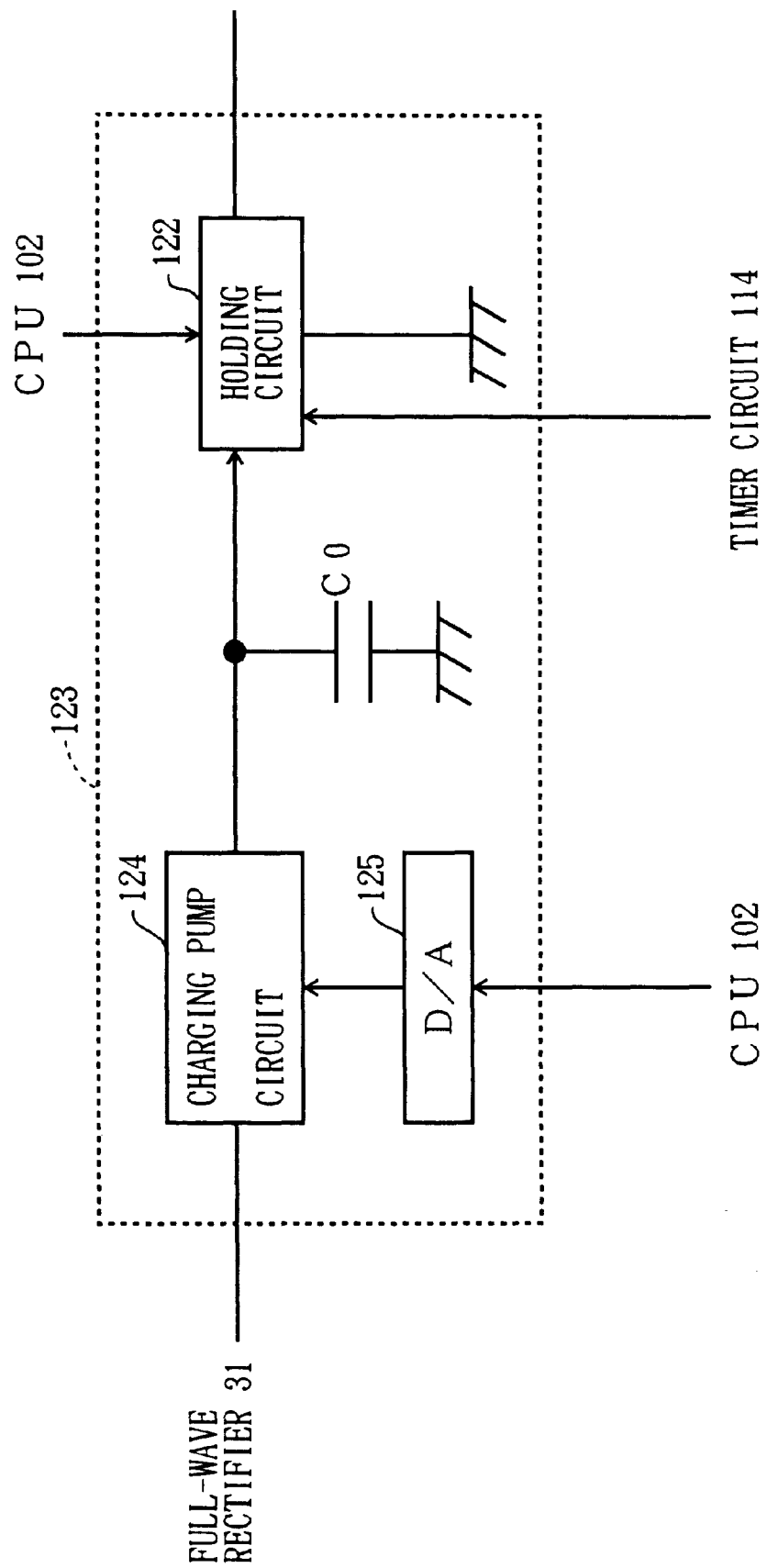
FIG. 13 shows a block diagram of a variant example of the integrating circuit in the embodiment of the present invention.

FIG. 13 shows a block diagram of a variant example of the integrating circuit in the embodiment of the present invention. In the figure, the same reference numerals are given to the parts the same as those of FIG. 11, and descriptions thereof will be omitted.

In the integrating circuit 123 in the variant example, the capacitance of a capacitor C0 is fixed, and the current in accordance with the output signal of the full-wave rectifier is supplied to the capacitor C0 by a charging pump circuit 124. The output current gain of the charging pump circuit 124 for the output signal of the full-wave rectifier 31 changes in accordance with instruction information from the CPU 102. The instruction information of the CPU 102 is converted into an analog signal by a DA converter 125 and is supplied to the charging pump circuit 124.

Figure 14:
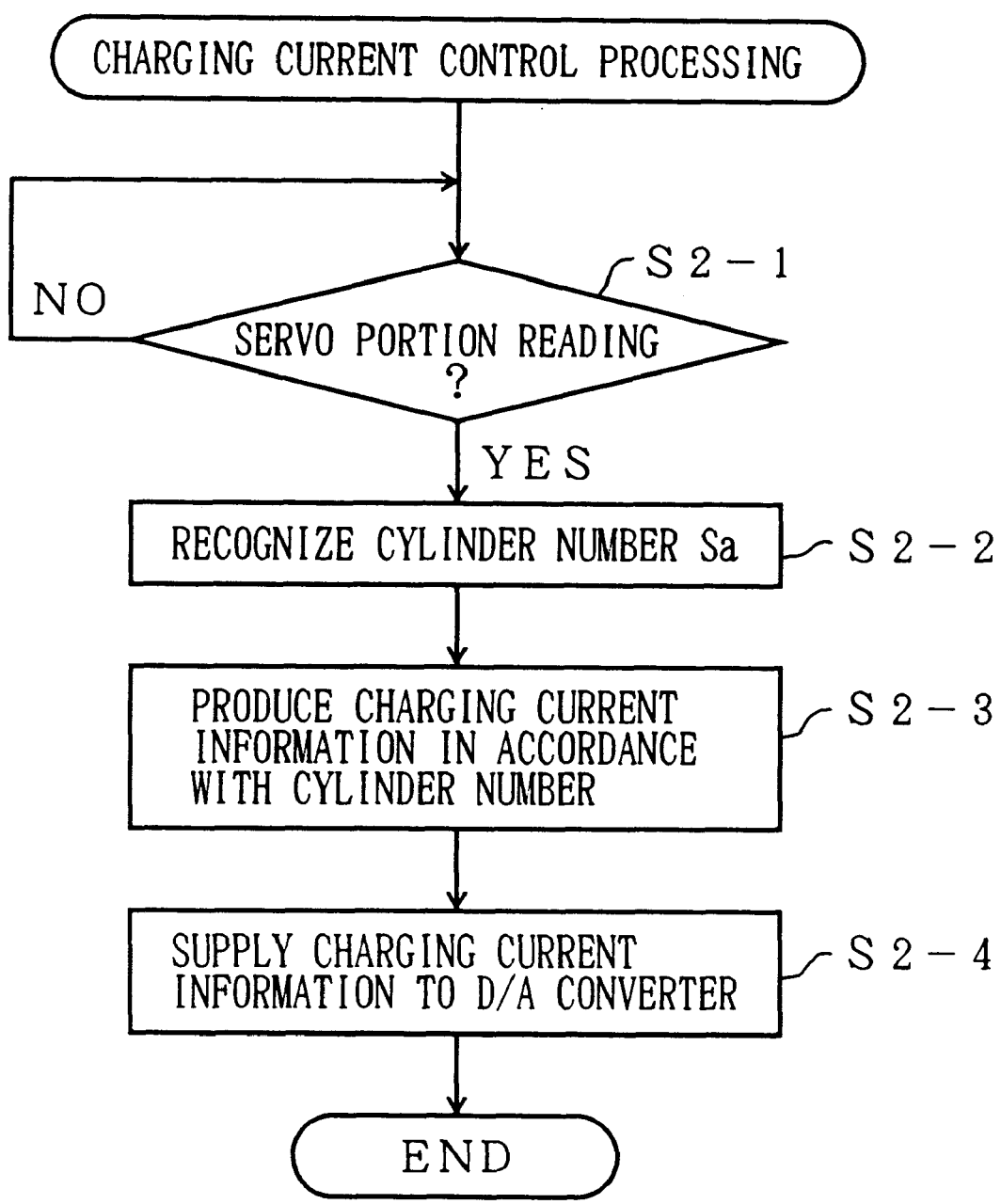
FIG. 14 shows a flowchart of charging current control processing of the CPU when the integrating circuit in the variant example of the embodiment of the present invention is used.

FIG. 14 shows a flowchart of charging current control processing of the CPU when the integrating circuit in the variant example of the embodiment of the present invention is used.

The CPU 102 monitors the signal from the signal detecting portion 8, and, when detecting the servo portion reading shown in the figure, performs the charging current control processing. The CPU 102 recognizes cylinder number information Sa supplied by the signal detecting portion 8 (in steps S2-1, S2-2).

When recognizing the cylinder number information Sa in the step S2-2, the CPU 102 reads charging current information which was previously set inside and supplies it to the D/A converter (in a step 2-3).

The charging current information was set in accordance with the half-value width $W_{50}$ of the reproduced signal of the servo burst portion, and was set so that a charging current supplied to the capacitor C0 from the charging pump circuit 124 is larger for a magnetic disk inner-side cylinder number.

The D/A converter 125 converts the charging current information supplied from the CPU 102 into the analog signal and supplies it to the charging pump circuit 124.

The charging pump circuit 124 amplifies the output signal of the full-wave rectifier with the gain which is in accordance with the charging current information from the CPU 102, and supplies the thus-obtained charging current to the capacitor CO.

Thus, the inclination of the integrated value of the servo burst portion can be fixed independent of the position of the magnetic head 3 on the magnetic disk 2. Thereby, it is possible that the position control sensitivities for the inner side and outer side of the magnetic disk 2 can be approximately equal. Accordingly, through the entire surface of the magnetic disk 2, the magnetic head 3 position control sensitivity can be fixed.

The integrated values of the servo burst signals detected by the integrating circuits 112, 123 shown in FIG. 11, FIG. 13 are supplied to the A/D converter 33.

The A/D converter 33 converts the analog integrated value, detected by the integrating circuit 112, into the digital data, and supplies it to the CPU 102.

The CPU 102 controls the position of the magnetic head 3 with respect to the magnetic disk 2 and thus performs servo processing based on the digital information supplied from the A/D converter 125.

Figure 15:
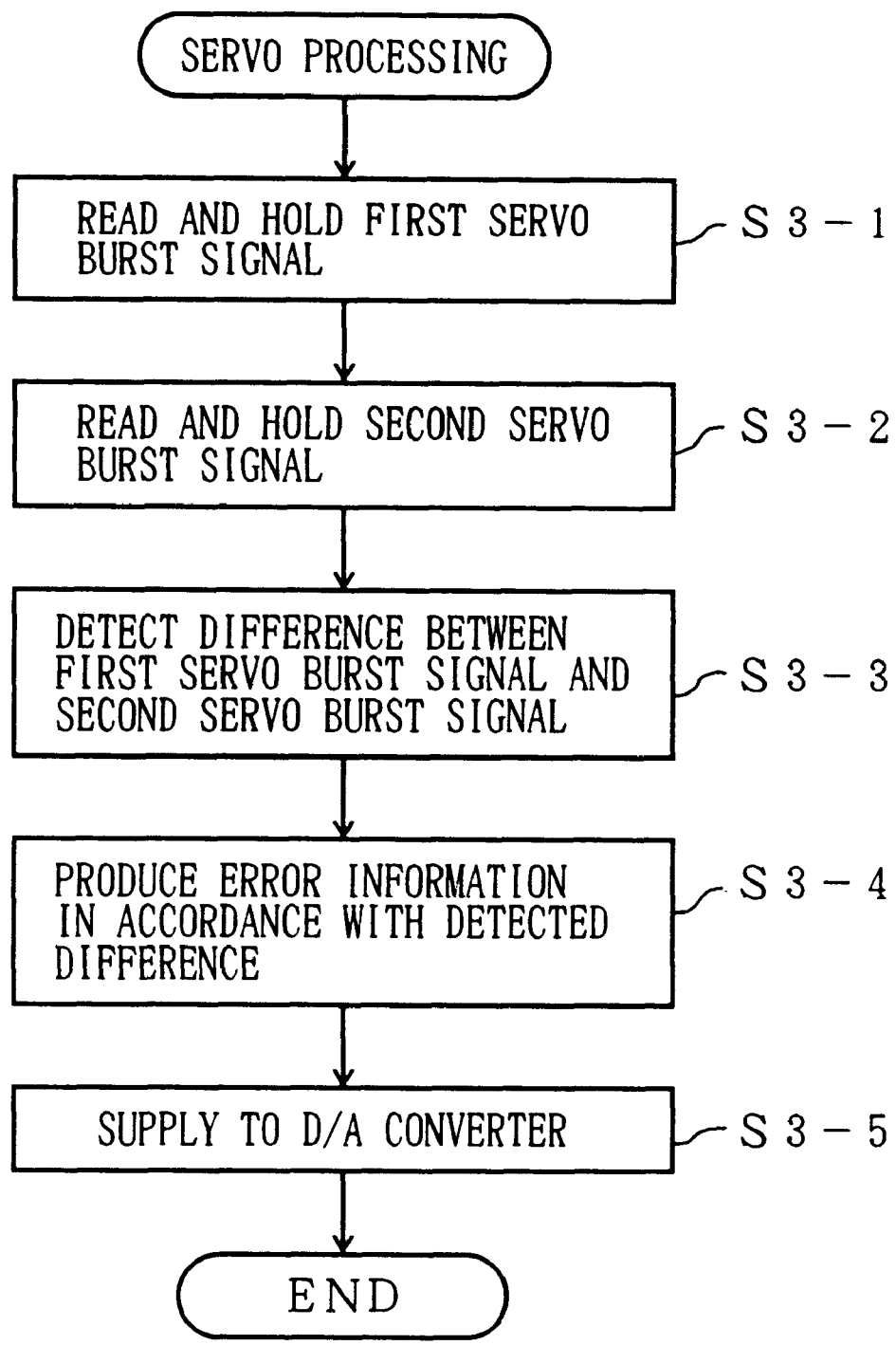
FIG. 15 shows a flowchart of the servo processing of the CPU in the embodiment of the present invention.

FIG. 15 shows a flowchart of the servo processing of the CPU in the embodiment of the present invention.

In the servo processing, the CPU 102 obtains from the A/D converter 33 the digital information corresponding to the integrated value of the first servo burst signal S1 shown in FIG. 3, and holds it (in a step S3-1).

The CPU 102 then obtains from the A/D converter 33 the digital information corresponding to the integrated value of the second servo burst signal S2, arranged subsequent to the first servo burst signal S1, shown in FIG. 3, and holds it (in a step S32).

The CPU 102 detects the difference between the integrated value of the first servo burst signal S1 obtained and held in the step S2-1 and the integrated value of the second servo burst signal S2 obtained and held in the step S2-2, and produces a head position control signal in accordance with the difference between the integrated value of the first servo burst signal S1 and the integrated value of the second servo burst signal S2 (in steps S3-3, S3-4).

The CPU 102 supplies the head position control signal, produced in the step S304, to the D/A converter 11, and finishes the servo processing (in S3-5).

The D/A converter 11 converts the head position control signal, supplied from the CPU 102, into an analog signal, and supplies it to the driver 12 which drives the actuator 5. In accordance with the head position control signal supplied from the D/A converter 11, the driver 12 corrects the driving signal which drives the actuator 5.

The driving signal, produced by the driver 12, is supplied to the actuator 5. The actuator 5 rotates in accordance with the driving signal supplied from the driver 12, and moves the magnetic head 3 in the inner and outer directions of the magnetic disk 2.

Thus, the first and second servo burst signals S1, S2, which are arranged in the boundary portions between the cylinder which the magnetic head 3 currently scans and the adjacent cylinders, are detected. Then, in accordance with the difference between the integrated values thereof, the magnetic head 3 is controlled so that the difference between the integrated values of the first and second servo burst signals S1, S2 becomes zero. That is, the magnetic head 3 is controlled so that the magnetic head 3 scans the center line of the desired cylinder.

Returning to FIG. 10, a zero-crossing counter 113 and a timer circuit 114 will now be described.

In the servo detecting portion 101, the output signal of the low-pass filter 111 is supplied to the integrating circuit 112 through the full-wave rectifier 31, is integrated, and also is supplied to the zero-crossing detector 34 and is used for controlling the integrating period of the integrating circuit 112.

The zero-crossing detector 34 detects the zero-crossing points of the signal supplied from the low-pass filter 111, and generates a one-shot pulse at the zero-crossing point.

The one-shot pulse generated at the zero-crossing point is supplied to the zero-crossing counter 113. The zero-crossing counter 113 counts the one-shot pulses, generated at the zero-crossing points, supplied from the zero-crossing detector 34. At this time, the zero-crossing counter is reset by the start control signal supplied from the CPU 102 and raises an output signal level to a high level.

When the count value has reached a previously set predetermined count value, the zero-crossing counter 113 inverts the output signal level to a low level.

The count value of the zero-crossing counter 113 is supplied to the timer circuit 114. The start control signal, which is the same as that supplied to the zero-crossing counter 113, is supplied to the timer circuit 114 from the CPU 102. The timer circuit 114 is reset in synchronization with the zero-crossing counter 113 by the start control signal, and performs time measurement of a predetermined time. The timer circuit 114 allows outputting of the output signal of the zero-crossing counter 113 after the predetermined time has elapsed.

FIGS. 16A, 16B and 16C show an operation explanation drawing of the timer circuit in the embodiment of the present invention. FIG. 16A shows the reproduced signal waveform of the servo burst portion which has undergone full-wave rectification of the full-wave rectifier 31. FIG. 16B shows the charged voltage waveform of the capacitor C1 or C2. FIG. 16C shows the output signal waveform of the timer circuit 114.

When the servo burst portion is detected at the time t1, the start control signal is supplied from the CPU 102 to the holding circuit 122, zero-crossing counter 113 and timer circuit 114. In response to the start control signal, the holding circuit 122 discharges the capacitor C1 or C2, and also, resets the held integrated value. Thereby, the charged voltage of the capacitor C1 or C2 is '0' as shown in FIG. 16B.

Then, when the signal, obtained from performing full-wave rectification on the reproduced signal of the servo burst portion, is supplied to the integrating circuit 112 from the full-wave rectifier 31, as shown in FIG. 16A, the capacitor C1 or C2 of the integrating circuit 112 is charged by the output signal of the full-wave rectifier 31. Thereby, as shown in FIG. 16B, the capacitor C1 or C2 is gradually charged by the reproduced signal of the servo burst portion.

The zero-crossing counter 113 is reset at the time t1 in response to the start control signal from the CPU 102, and the output signal level is caused to be the high level. Then, the zero-crossing counter 113 counts the zero-crossing points, of the reproduced signal of the servo burst portion, detected by the zero-crossing detector 34. After counting the zero-crossing points to a predetermined number, for example, '10', the zero-crossing counter 113 inverts the output signal level from the high level to the low level.

The timer circuit 114 is reset at the time t1 in response to the start control signal from the CPU 102, and measures time until the time t2 which is the time after a predetermined time T0 has elapsed. After the predetermined time T0 has elapsed, the timer circuit 114 allows outputting of the output signal of the zero-crossing counter 113. The predetermined time T0 is set to be the time which is shorter than the time which is required for the count value to become the predetermined number when the zero-crossing points are counted in the normal case.

Thereby, even if the zero-crossing points have reached the predetermined count value at the time t3 and the output signal level of the zero-crossing counter 113 becomes the low level, because the time measurement of the timer circuit 114 has not measured the predetermined time T0 from the time t1, the output signal level supplied to the integrating circuit 112 from the timer circuit 114 is maintained at the high level. At the time t2 after the measured time of the timer circuit 114 has reached the predetermined time measurement time T0, the output signal level is caused to be the low level.

Further, after the measured time of the timer 114 since the reproduced signal of the servo burst portion was supplied has reached the predetermined time T0, the output signal of the zero-crossing counter 113 is supplied to the integrating circuit 112. At this time, when the count value of the zero-crossing counter 113 has not reached the predetermined count value, the level of the output signal of the zero-crossing counter 113 is the high level and thus the signal supplied to the integrating circuit 112 is the high level.

When the count value of the zero-crossing points of the zero-crossing counter 113 has reached the predetermined count value at the time t4, the level of the output signal of the zero-crossing counter 113 is inverted into the low level. Accordingly, at the time t4, the signal supplied to the integrating circuit 112 is inverted into the low level.

The output signal from the timer circuit 114 is supplied to the holding circuit 122 of the integrating circuit 112. The holding circuit 122 of the integrating circuit 112 receives the charged voltage of the capacitor C1 or C2 and holds it when the level of the output signal from the timer circuit 114 is the high level. When the level of the output signal from the timer circuit 114 is the low level, the holding circuit 122 disconnects the connection with the capacitor C1 or C2 and holds the charged voltage when the output signal level has become the low level.

Thus, even if the count value of the zero-crossing points of the reproduced signal of the servo burst portion varies due to noises or the like and the zero-crossing points which should be counted are not counted, the charged voltage of the capacitor C1 or C2 of the integrating circuit 112 is held by the holding circuit 122 until the time reaches in the proximity of the time of the correct count value. As a result, the integrated value for approximately the servo burst portion can be detected.

When the zero-crossing points of the reproduced signal of the servo burst portion are correctly counted, the time measurement of the timer circuit 114 is finished immediately before the zero-crossing point of the correct count value. When the counting has been finished, the charged voltage of the capacitor C1 or C2 is held by the holding circuit 122. Accordingly, the integrated value of the servo burst portion can be accurately detected.

In the embodiment, the zero-crossing counter 113 manages the count value of the zero-crossing points to be counted, the timer circuit 114 manages the time at which the count value of the zero-crossing points of the reproduced signal of the servo burst portion should reach the predetermined count value, and the time of detecting the charged voltage of the capacitor C1 or C2 of the integrating circuit 112 is controlled. Thereby, the integrated value of the servo burst portion can be accurately detected, and thereby, scanning of the cylinder by the magnetic head 3 can be accurately performed.

In the embodiment, the timer circuit 114 performs control so that, after the predetermined time T0 has elapsed since the integration was started, the integrating circuit 112 is stopped by the output of the zero-crossing counter 113. Further, it can also be considered that integration finish time is set and excess integration due to erroneous counting of the like is prevented.

FIGS. 17A, 17B and 17C show an operation explanation drawing of a variant example of the timer circuit in the embodiment of the present invention. FIG. 17A shows the reproduced signal waveform of the servo burst portion which has undergone full-wave rectification of the full-wave rectifier 31. FIG. 17B shows the charged voltage waveform of the capacitor C1 or C2. FIG. 17C shows an output signal allowing waveform of the timer circuit 114.

When the servo burst portion is detected at the time t1, the start control signal is supplied from the CPU 102 to the holding circuit 122, zero-crossing counter 113 and timer circuit 114. In response to the start control signal, the holding circuit 122 discharges the capacitor C1 or C2 and resets the held integrated value. Thereby, the charged voltage of the capacitor C1 or C2 is '0' as shown in FIG. 17B.

Then, when the signal, obtained from performing full-wave rectification on the reproduced signal of the servo burst portion, is supplied to the integrating circuit 112 from the full-wave rectifier 31, as shown in FIG. 17A, the capacitor C1 or C2 of the integrating circuit 112 is charged by the output signal of the full-wave rectifier 31. Thereby, as shown in FIG. 17B, the capacitor C1 or C2 is gradually charged by the reproduced signal of the servo burst portion.

The zero-crossing counter 113 is reset at the time t1 in response to the start control signal from the CPU 102, and the output signal level is caused to be the high level. Then, the zero-crossing counter 113 counts the zero-crossing points, of the reproduced signal of the servo burst portion, detected by the zero-crossing detector 34. After counting the zero-crossing points to a predetermined number, for example, '10', the zero-crossing counter 113 inverts the output signal level from the high level to the low level.

The timer circuit 114 is reset at the time t1 in response to the start control signal from the CPU 102, and starts time measurement. The timer circuit 114 maintains the level of the signal, which is supplied to the integrating circuit 112, to be the high level until the time t2 at which the measured time has reached a previously set first time T1, and maintains the same to be the low level after the time t3 at which the measured time has reached a previously set second time T2.

Further, the timer circuit 114 allows supplying of the output signal of the zero-crossing counter 113 to the integrating circuit 112 during the time T0 from the time after the time T1 has elapsed to the time after the time T2 has elapsed since the timer circuit 114 was reset.

The first time T1 is set to a time which is shorter than the time which is required for the count value to reach the predetermined value when the zero-crossing points are counted in the normal case. The second time T2 is set to a time which is longer than the time which is required for the count value to reach the predetermined value when the zero-crossing points are counted in the normal case.

Accordingly, even if the count value of the zero-crossing points has reached the predetermined count value at the time t4 and the level of the output signal of the zero-crossing counter 113 becomes the low level, because the measured time of the timer circuit 114 from the time t1 has not reached the predetermined time T1, the level of the output signal supplied from the timer circuit 114 to the integrating circuit 112 is maintained to be the high level. At the time t2 at which the measured time of the timer circuit 114 has reached the time T1, the level of the output signal supplied from the timer circuit 114 to the integrating circuit 112 is caused to be the low level, and the integration operation of the integrating circuit 112 is stopped.

After the measured time of the timer circuit 114 since the reproduced signal of the servo burst portion was supplied has reached the first time T1, the output signal of the zero-crossing counter 113 is supplied to the integrating circuit 112. Therefore, when the count value of the zero-crossing points of the zero-crossing counter 113 has not reached the predetermined value, the level of the output signal of the zero-crossing counter 113 is the high level. Accordingly, the level of the signal supplied to the integrating circuit 112 is maintained to be the high level. When the count value of the zero-crossing points of the zero-crossing counter 113 has reached the predetermined count value at the time t5, the level of the output signal of the zero-crossing counter 113 is inverted into the low level. Accordingly, the level of the signal supplied to the integrating circuit 112 at the time t5 is inverted to the low level. Thereby, the integration operation of the integrating circuit 112 is stopped.

At the time t3 at which the measured time of the timer circuit 114 since the reproduced signal of the servo burst portion was supplied has reached the second time T2, the level of the signal supplied to the integrating circuit 112 is forcibly caused to be the low level independent of the output signal of the zero-crossing counter 113. Thereby, the integration operation of the integrating circuit 112 is stopped.

In the embodiment, when it is the time t3 at which the measured time of the timer circuit 114 has reached the second time T2, the level of the signal supplied to the integrating circuit 112 is forcibly caused to be the low level independent of the output signal of the zero-crossing counter 113. Thereby, the integration operation of the integrating circuit 112 is stopped. Accordingly, even if there are the zero-crossing points which are not counted by the zero-crossing counter 113 due to erroneous counting or the like, the integration operation of the integrating circuit 112 can be stopped when the measured time of the timer circuit 112 has reached the second time T2 at which the-count value of the zero-crossing points are considerably deviated from the previously set predetermined count value. Thereby, it is possible to prevent the integrating circuit 112 from performing more integration operation than is necessary.

Accordingly, considerable deviation of the integrated value of the servo burst signal does not occur, and the precise servo operation can be performed.

The present invention is not limited to the above-described embodiment and variant examples, and variations and modifications may be made without departing from the scope of the present invention claimed in the following claims.

What is claimed is:

1. A head position detecting method comprising the steps of:
    a) eliminating a noise component from a servo signal recorded on a recording medium and read by a head;
    b) counting a number of times that a noise eliminated servo signal crosses zero-cross points in order to determine an integration period based on the number of times;
    c) integrating the noise-eliminated servo signal for said integration period, an integrated value thus obtained indicating a position of the head; and
    d) controlling integration sensitivity of said step c) in accordance with a position at which said head detects the servo signal on said recording medium, so that the inclination of the integrated value is fixed.

2. A head position detecting method comprising the steps of:
    a) counting a number of times that a servo signal, recorded on a recording medium and read by a head, crosses zero-cross points;
    b) measuring a time since said step a) started;
    c) integrating the servo signal, an integrated value thus obtained indicating a position of the head;
    d) stopping the integration of the servo signal when both first and second conditions are met, the first condition being that the measured time obtained from said step b) has reached or exceeded a predetermined time and the second condition being that the counted number obtained from said step a) has reached a predetermined count value, said predetermined time being defined to be shorter than a period of time from the start of the measurement to a time at which the counted number reaches the predetermined count value.

3. The head position detecting method according to claim 2, further comprising the step of
    d) eliminating a noise component from the servo signal before said step c).

4. The head position detecting method according to claim 2, further comprising the step of e) controlling integration sensitivity of said step c) in accordance with a position at which said head detects the servo signal on said recording medium, so that the inclination of the integrated value is fixed.

5. A head position detecting method comprising the steps of:
    a) counting a number of times that a servo signal, recorded on a recording medium and read by a head, crosses zero-cross points;
    b) measuring a time since said step a) started;
    c) integrating the servo signal, an integrated value thus obtained indicating a position of the head;
    d) stopping said step c) when a time measured by said step b) has reached a predetermined time which is longer than a time from a time at which said step a) started to a time at which a count number obtained from said step a) reaches a predetermined value; and
    e) controlling integration sensitivity of said step c) in accordance with a position at which said head detects the servo signal on said recording medium, so that the inclination of the integrated value is fixed.

6. The head position detecting method according to claim 5, further comprising the step of
    d) eliminating a noise component from the servo signal before said step c).

7. A disk device comprising:
    a filter for eliminating a noise component from a servo signal recorded on a disk-shaped recording medium and read by a head;
    a zero-crossing counter for counting a number of times that a noise eliminated servo signal crosses zero-cross points in order to determine an integration period based on the number of times;
    an integrating circuit for integrating the noise-eliminated servo signal for said integration period, an integrated value thus obtained indicating a position of the head;
    controlling means for controlling a position of the head on the disk-shaped recording medium based on the integrated value obtained from said integrating circuit; and
    integration sensitivity controlling means for controlling integration sensitivity of integration performed by said integrating circuit so that the inclination of the integrated value is fixed, in accordance with a position at which said head detects the servo signal on said disk shaped recording medium.

8. The disk device according to claim 7, wherein:
    said integrating circuit comprises charge storing means which is charged with the servo signal; and
    said integration sensitivity controlling means controls capacitance of said charge storing means in accordance with a position at which said head detects the servo signal on said disk-shaped recording medium.

9. The disk device according to claim 8,
    wherein:
    said charge storing means comprises a plurality of capacitors having different capacitances; and
    said integration sensitivity controlling means performs switching of connection of said plurality of capacitors, in accordance with a position at which said head detects the servo signal on said disk-shaped recording medium, so as to control the capacitance of said charge storing means.

10. The disk device according to claim 7, wherein:
    said integrating circuit comprises a capacitor which is charged with a charging current; and
    said integration sensitivity controlling means controls the charging current of said capacitor in accordance with a position at which said head detects the servo signal on said disk-shaped recording medium.

11. The disk device according to claim 10, wherein said integration sensitivity controlling means generates the charging current in accordance with the servo signal and supplies the charging current to said capacitor, and comprises a charging pump circuit for controlling the charging current in accordance with a position at which said head detects the servo signal on said disk-shaped recording medium.

12. A disk device comprising:
    a zero-crossing counter for counting a number of times that a servo signal, recorded on an disk-shaped recording medium and read by a head, crosses zero-cross points;

time measuring means for measuring a time since said zero-crossing counter started the counting;

an integrating circuit for integrating the servo signal, an integrated value thus obtained indicating a position of the head;

controlling means for controlling a position of the head on the disk-shaped recording medium based on the integrated value obtained from said integrating circuit; and integration stopping means for stopping integration of said integrating circuit when both first and second conditions are met, the first condition being that the measured time has reached or exceeded a predetermined time and the second condition being that the counted number obtained from said zero-crossing counter has reached a predetermined count value said predetermined time being defined to be shorter than a period of time from the start of the measurement to a time at which the counted number reaches the predetermined count value.

13. The disk device according to claim 12, further comprising a filter for eliminating a noise component from the servo signal before said integrating circuit performs integration of the servo signal.

14. The disk device according to claim 12, further comprising integration sensitivity controlling means for controlling integration sensitivity of integration performed by said integrating circuit so that the inclination of the integrated value is fixed, in accordance with a position at which said head detects the servo signal on said disk-shaped recording medium.

15. The disk device according to claim 14, wherein:

said integrating circuit comprises charge storing means which is charged with the servo signal; and said integration sensitivity controlling means controls capacitance of said charge storing means in accordance with a position at which said head detects the servo signal on said disk-shaped recording medium.

16. The disk device according to claim 15, wherein:

said charge storing means comprises a plurality of capacitors having different capacitances; and said integration sensitivity controlling means performs switching of connection of said plurality of capacitors, in accordance with a position at which said head detects the servo signal on said disk-shaped recording medium, so as to control the capacitance of said charge storing means.

17. The disk device according to claim 14, wherein:

said integrating circuit comprises a capacitor which is charged with a charging current; and said integration sensitivity controlling means controls the charging current of said capacitor in accordance with a position at which said head detects the servo signal on said disk-shaped recording medium.

18. The disk device according to claim 17, wherein said integration sensitivity controlling means generates the charging current in accordance with the servo signal and supplies the charging current to said capacitor, and comprises a charging pump circuit for controlling the charging current in accordance with a position at which said head detects the servo signal on said disk-shaped recording medium.

19. A disk device comprising:

a zero-crossing counter for counting a number of times that a servo signal, recorded on an disk-shaped recording medium and read by a head, crosses zero-cross points;

time measuring means for measuring a time since said zero-crossing counter started the counting;

an integrating circuit for integrating the servo signal, an integrated value thus obtained indicating a position of the head;

controlling means for controlling a position of the head on the disk-shaped recording medium based on the integrated value obtained from said integrating circuit;

integration stopping means for stopping integration of said integrating circuit when a time measured by said time measuring means has reached a predetermined time which is longer than a time from a time at which said zero-crossing counter started the counting to a time at which a count number obtained from said zero-crossing counter reaches a predetermined value; and integration sensitivity controlling means for controlling integration sensitivity of integration performed by said integrating circuit so that the inclination of the integrated value is fixed, in accordance with a position at which said head detects the servo signal on said disk-shaped recording medium.

20. The disk device according to claim 19, further comprising a filter for eliminating a noise component from the servo signal before said integrating circuit performs integration of the servo signal.

21. The disk device according to claim 19, wherein:

said integrating circuit comprises charge storing means which is charged with the servo signal; and said integration sensitivity controlling means controls capacitance of said charge storing means in accordance with a position at which said head detects the servo signal on said disk-shaped recording medium.

22. The disk device according to claim 21, wherein:

said charge storing means comprises a plurality of capacitors having different capacitances; and said integration sensitivity controlling means performs switching of connection of said plurality of capacitors, in accordance with a position at which said head detects the servo signal on said disk-shaped recording medium, so as to control the capacitance of said charge storing means.

23. The disk device according to claim 19, wherein:

said integrating circuit comprises a capacitor which is charged with a charging current; and said integration sensitivity controlling means controls the charging current of said capacitor in accordance with a position at which said head detects the servo signal on said disk-shaped recording medium.

24. The disk device according to claim 23, wherein said integration sensitivity controlling means generates the charging current in accordance with the servo signal and supplies the charging current to said capacitor, and comprises a charging pump circuit for controlling the charging current in accordance with a position at which said head detects the servo signal on said disk-shaped recording medium.

25. A disk device comprising:

a zero-crossing counter for counting a number of times that a servo signal, recorded on a disk-shaped recording medium and read by a head, crosses zero-cross points in order to determine an integration period based on the number of times;

an integrating circuit for integrating the servo signal for said integration period with integration sensitivity, an integrated value thus obtained indicating a position of the head; and controlling means for controlling a position of the head on the disk-shaped recording medium based on the integrated value obtained from said integrating circuit; and integration sensitivity controlling means for controlling said integration sensitivity in accordance with a position at which the head detects the servo signal on the disk-shaped recording medium, so that the inclination of the integrated value is fixed.

26. The disk device according to claim 25, wherein:

said integrating circuit comprises charge storing means which is charged with the servo signal; and said integration sensitivity controlling means controls capacitance of said charge storing means in accordance with a position at which said head detects the servo signal on said disk-shaped recording medium.

27. The disk device according to claim 26, wherein:

said charge storing means comprises a plurality of capacitors having different capacitances; and said integration sensitivity controlling means performs switching of connection of said plurality of capacitors, in accordance with a position at which said head detects the servo signal on said disk-shaped recording medium, so as to control the capacitance of said charge storing means.

28. The disk device according to claim 25, wherein:

said integrating circuit comprises a capacitor which is charged with a charging current; and said integration sensitivity controlling means controls the charging current of said capacitor in accordance with a position at which said head detects the servo signal on said disk-shaped recording medium.

29. The disk device according to claim 28, wherein said integration sensitivity controlling means generates the charging current in accordance with the servo signal and supplies the charging current to said capacitor, and comprises a charging pump circuit for controlling the charging current in accordance with a position at which said head detects the servo signal on said disk-shaped recording medium.

* * * * *